US012717659B1

(12) United States Patent
Desai et al.

(10) Patent No.: US 12,717,659 B1
(45) Date of Patent: Aug. 25, 2026

(54) SCALABLE CORRECTNESS CHECKING OF DISTRIBUTED APPLICATIONS DURING MULTIPLE PHASES OF APPLICATION LIFECYCLES

(71) Applicant: Amazon Technologies, Inc., Seattle, WA (US)

(72) Inventors: Ankush Pankaj Desai, San Jose, CA (US); Jigar Rudani, Kent, WA (US)

(73) Assignee: Amazon Technologies, Inc., Seattle, WA (US)

(*) Notice: Subject to any disclaimer, the term of this patent is extended or adjusted under 35 U.S.C. 154(b) by 713 days.

(21) Appl. No.: 18/058,718

(22) Filed: Nov. 23, 2022

(51) Int. Cl.
*G06F 9/54* (2006.01)
*G06F 11/34* (2006.01)

(52) U.S. Cl.
CPC .......... *G06F 9/542* (2013.01); *G06F 11/3409* (2013.01)

(58) Field of Classification Search
CPC ............................ G06F 9/542; G06F 11/3409
USPC ........................................................ 719/318
See application file for complete search history.

(56) References Cited

U.S. PATENT DOCUMENTS 7,634,759 B2 12/2009 Calsyn et al.
7,992,133 B1 8/2011 Theroux et al.
9,122,793 B2 9/2015 Bragstad et al.
9,208,057 B2 12/2015 Bassuari et al.
10,185,644 B2 1/2019 Pechanec et al.
2008/0300838 A1* 12/2008 Drumm ................. G06Q 10/10 703/6
2011/0138047 A1* 6/2011 Brown .................. G06F 9/5072 715/810
2013/0129345 A1* 5/2013 Meng .................... H04J 3/1652 398/25
2014/0040368 A1* 2/2014 Janssens ................ G06Q 10/40 709/204
2014/0214888 A1* 7/2014 Marquardt .......... G06F 16/2455 707/769
2015/0106942 A1* 4/2015 Borghetti ............... G06F 21/51 726/25
2015/0227518 A1* 8/2015 Kallan ................ G06F 16/2358 707/725
2016/0343093 A1* 11/2016 Riland .................. G06Q 50/06
2017/0075744 A1* 3/2017 Deshpande ......... H04L 41/0631
2018/0314603 A1* 11/2018 Gibbons, Jr. ....... H04L 67/1097
2018/0329767 A1* 11/2018 Kirshenbaum ..... G06F 11/0778
2018/0332069 A1* 11/2018 Moore .................. G06F 21/105
2019/0098037 A1* 3/2019 Shenoy, Jr. ......... H04L 63/1441
2019/0339873 A1* 11/2019 Mainali ................ G06F 16/128
2021/0117544 A1* 4/2021 Kurtz .................... G06F 21/566
2021/0342837 A1* 11/2021 Chen ..................... H04L 9/3297
2022/0100772 A1* 3/2022 Kadarundalagi Raghura ............. G06F 16/254
2022/0101357 A1* 3/2022 Koh ....................... G06Q 50/01
(Continued)

*Primary Examiner* — Tuan C Dao
(74) *Attorney, Agent, or Firm* — Robert C. Kowert; Kowert, Hood, Munyon, Rankin & Goetzel, P.C.

(57) ABSTRACT

Log records are collected from resources used for various constituent services of a distributed application during an execution of the application. An aggregated event record sequence corresponding to the execution is generated from the log records, with individual event records indicating occurrences of events for which expected responses of the constituent services are indicated in correctness checking rule sets associated with the application. An action responsive to a violation of a correctness checking rule set is initiated after the violation is detected based on analysis of the event records.

18 Claims, 10 Drawing Sheets

(56) References Cited

U.S. PATENT DOCUMENTS

2022/0398173 A1* 12/2022 Rodriguez Bravo ........................ G06F 11/2023
2023/0077037 A1* 3/2023 Zimmerman ........... G10L 15/01
2023/0401228 A1* 12/2023 Thandra .............. G06F 11/3476

* cited by examiner

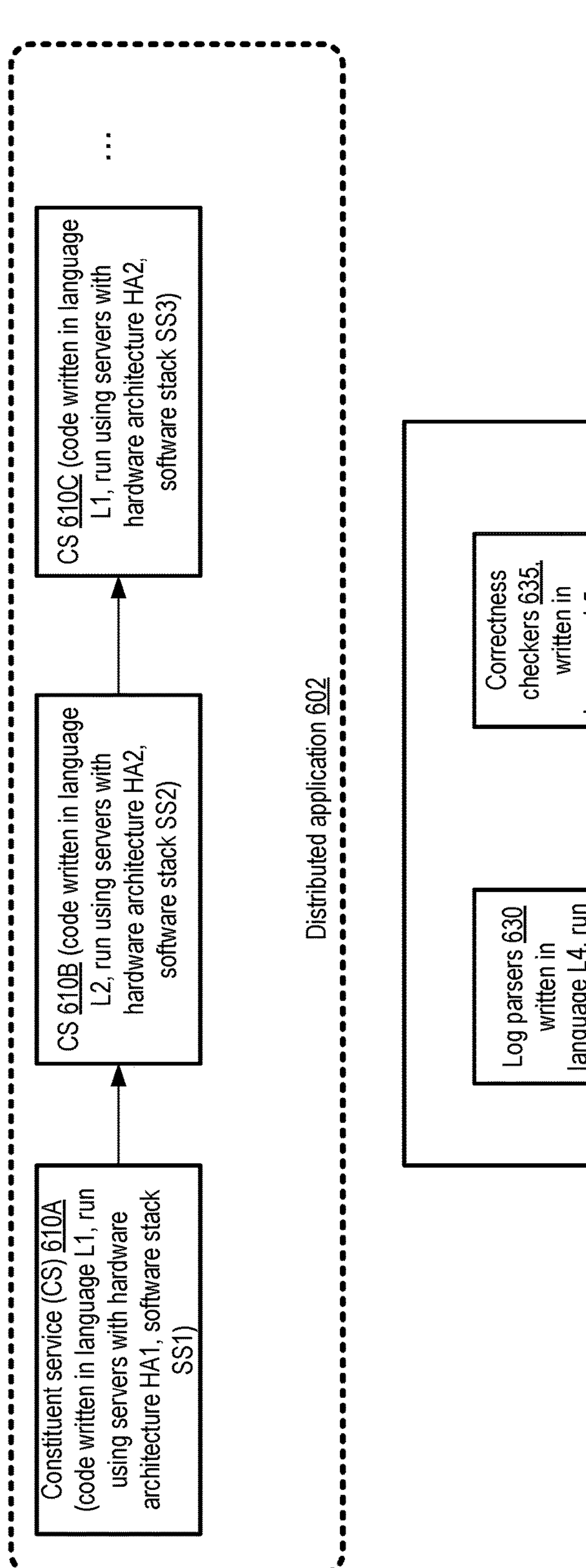
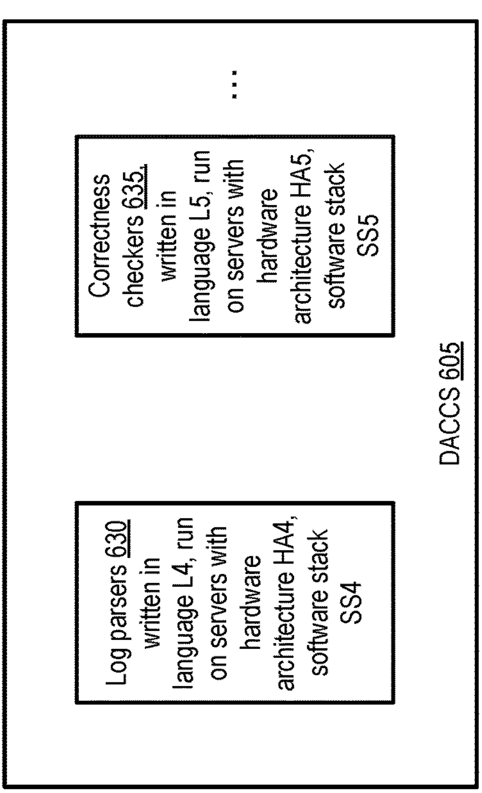
FIG. 6

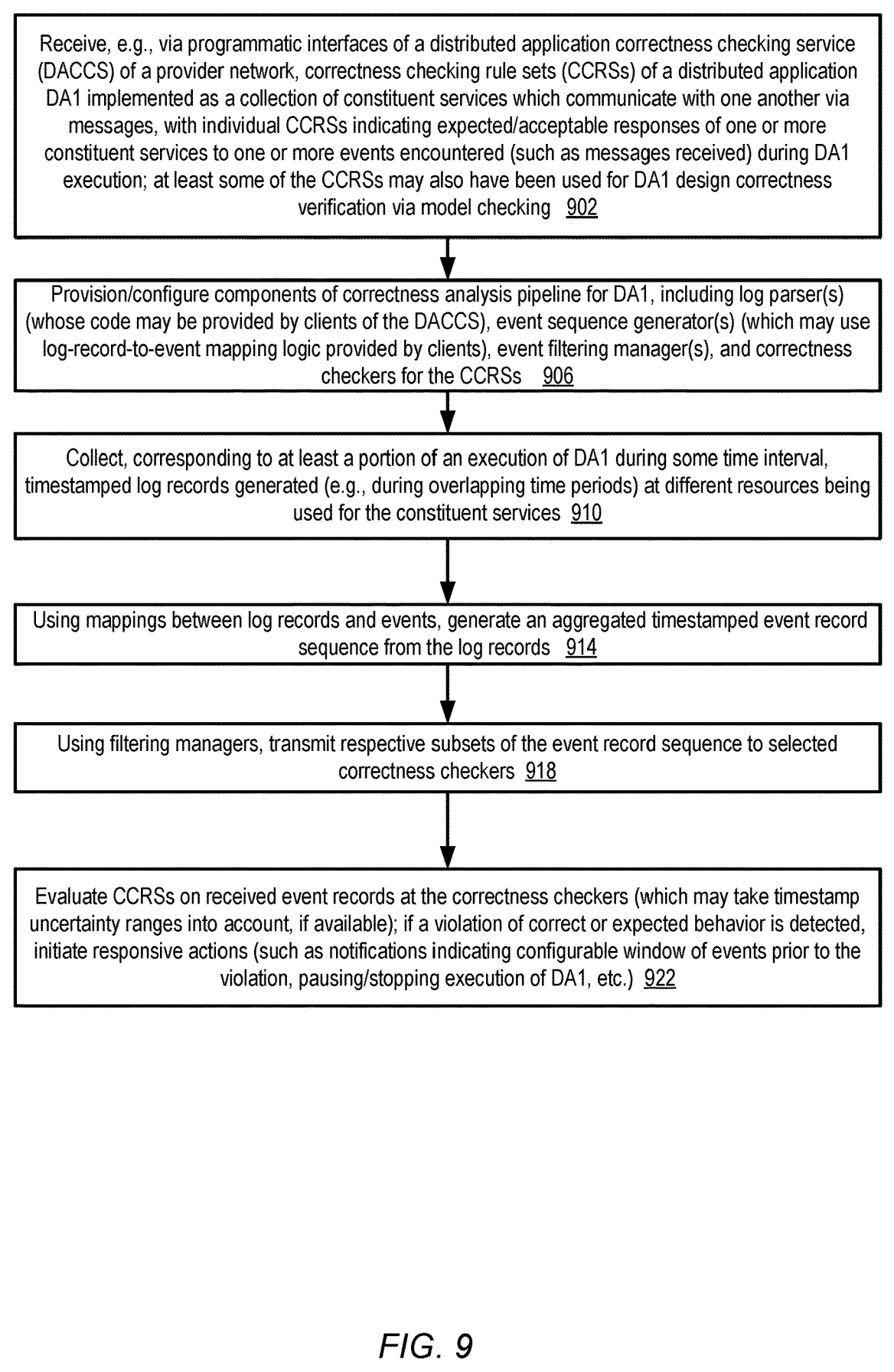

Receive, e.g., via programmatic interfaces of a distributed application correctness checking service (DACCS) of a provider network, correctness checking rule sets (CCRSs) of a distributed application DA1 implemented as a collection of constituent services which communicate with one another via messages, with individual CCRSs indicating expected/acceptable responses of one or more constituent services to one or more events encountered (such as messages received) during DA1 execution; at least some of the CCRSs may also have been used for DA1 design correctness verification via model checking 902

Provision/configure components of correctness analysis pipeline for DA1, including log parser(s) (whose code may be provided by clients of the DACCS), event sequence generator(s) (which may use log-record-to-event mapping logic provided by clients), event filtering manager(s), and correctness checkers for the CCRSs 906

Collect, corresponding to at least a portion of an execution of DA1 during some time interval, timestamped log records generated (e.g., during overlapping time periods) at different resources being used for the constituent services 910

Using mappings between log records and events, generate an aggregated timestamped event record sequence from the log records 914

Using filtering managers, transmit respective subsets of the event record sequence to selected correctness checkers 918

Evaluate CCRSs on received event records at the correctness checkers (which may take timestamp uncertainty ranges into account, if available); if a violation of correct or expected behavior is detected, initiate responsive actions (such as notifications indicating configurable window of events prior to the violation, pausing/stopping execution of DA1, etc.) 922

*FIG. 9*

SCALABLE CORRECTNESS CHECKING OF DISTRIBUTED APPLICATIONS DURING MULTIPLE PHASES OF APPLICATION LIFECYCLES

BACKGROUND

Programming distributed applications is challenging, especially in scenarios in which a service-oriented architecture is employed, resulting in applications which can include hundreds or even thousands of micro-services communicating asynchronously with one another. The arrivals of messages from other constituent components can be interleaved in many different ways, errors or network delays can occur at arbitrary times, and so on, making thorough testing for correct application behavior quite complicated.

BRIEF DESCRIPTION OF DRAWINGS

FIG. 6 illustrates a distributed application correction checking service which is agnostic with respect to the programming languages, hardware architectures and software stacks used for implementing constituent services of the applications, according to at least some embodiments.

FIG. 9 is a flow diagram illustrating aspects of operations which may be performed to verify the correctness of a distributed application, according to at least some embodiments.

Figure 1:
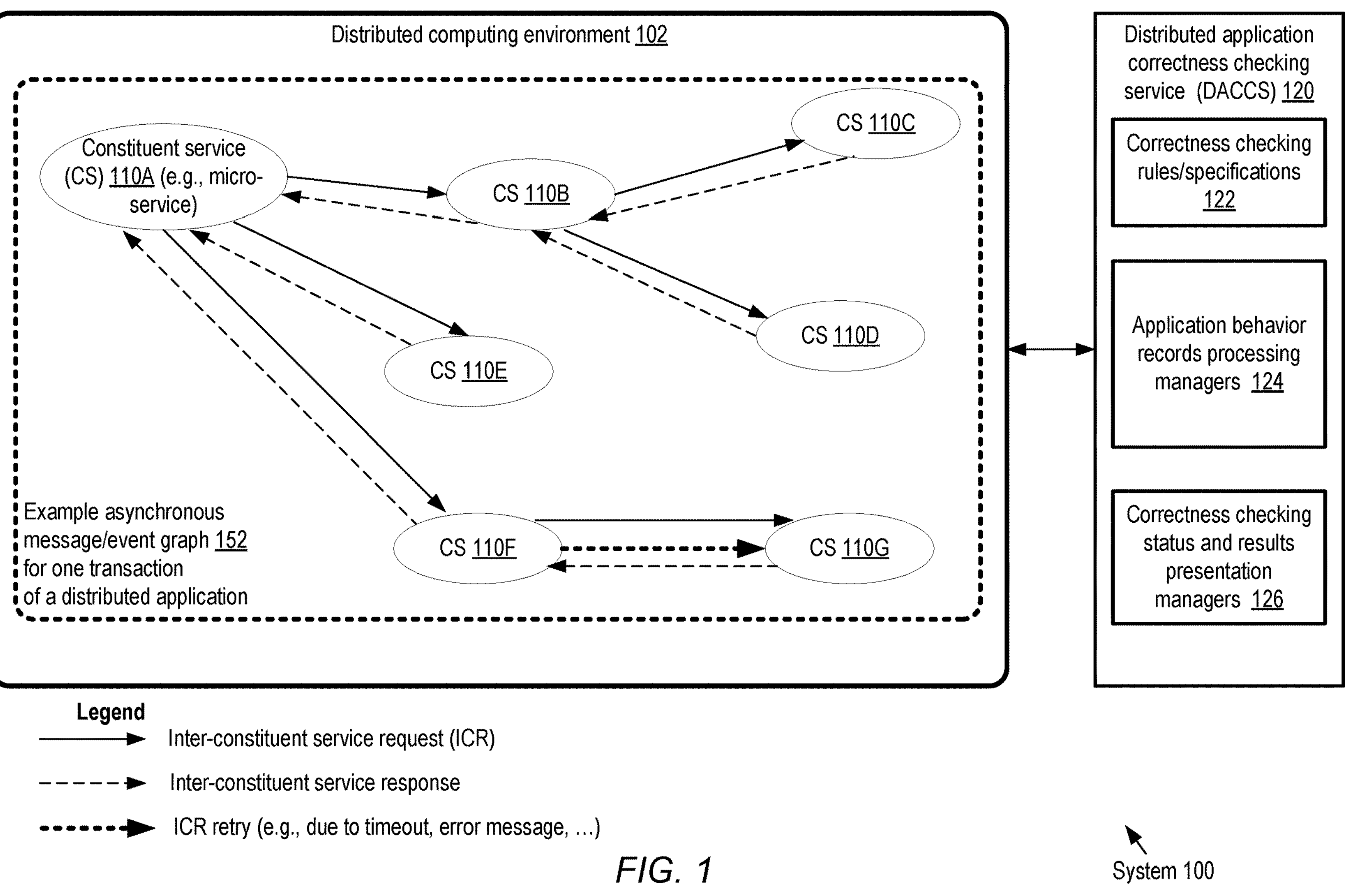
FIG. 1 illustrates an example system environment in which a distributed application correctness checking service may be employed for analyzing large-scale applications which are implemented as collections of interacting constituent services, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" or "collection" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enhancing large-scale distributed applications by enabling correctness checking to be performed in a scalable manner during multiple stages of the applications' lifecycles, including during testing and production deployment stages. Distributed applications, including many applications implemented at cloud computing environments, are often implemented using a service-oriented architecture (SOA), in which the functionality of the application as a whole is divided among numerous asynchronously interacting subcomponents referred to as constituent services or micro-services of the applications. This approach has many benefits such as enabling small agile teams of software engineers to focus on enhancing features of the individual constituent services, making updates more manageable, reducing the risks and impacts of individual failures, making debugging easier, and so on. To complete a given unit of work on behalf of a client of the distributed application, several of the constituent services may send requests to other constituent services (often via network messages corresponding to application programming interface (API) calls) and obtain responses to those requests. In some cases, hundreds or thousands of constituent services may be involved. Testing the overall distributed application is complicated for a variety of reasons: messages from other constituent services can be received (in general) at arbitrary times and in arbitrary order relative to other messages, network transmissions can sometimes be delayed, network links can fail, constituent services can fail and recover after arbitrary times, and so on. Unsurprisingly, correctness bugs are often found after deployment of the applications in production environments. Note that a distributed application itself may be accessible to its clients via a network and its own APIs in at least some embodiments, and may thus be considered a service as well. To distinguish the distributed applications from the lower-level services that work together to implement the overall logic of the distributed applications, the lower-level services that constitute or form a distributed application are referred to as constituent services of the distributed application herein.

Some organizations use formal methods for correctness checking during the design phases of distributed applications. For example, finite state machine models of various subcomponents (such as individual constituent services, or portions of one or more constituent services) may be created, and model checking programs (or other formal methods for correctness checking such as theorem proving) may be employed to verify correctness of the models with respect to formal specifications. However, model-based checking of correctness at the design stage may sometimes be insufficient—for example, the actual implementations of the components may not completely match the models, and/or resource constraints may limit the thoroughness (e.g., the total number of states analyzed) with which the model checkers or other design-phase techniques can verify correctness. As a result, important bugs may not be found if correctness checking is only performed during the design phase.

Accordingly, in various embodiments, in addition to (or instead of) design-stage correctness checking, a scalable technique for analyzing application behavior for correctness after the applications have been designed may be employed. Such a technique may for example rely on correctness checking rule sets provided by application developers, and on distributed/parallelized processing of log records (using parsers which may also be provided by the application developers) generated from running code of the applications in test environments and/or in production environments. High-volume streams of log records may be partitioned based on keys in the log records in some cases, with each partition potentially being examined in parallel with other partitions for scalability. Multiple checkers of correctness rules may be established, with different rule sets being checked in parallel. In some cases, the application behavior may be analyzed using a cloud-based application correctness checking service, which can deploy large amounts of cloud provider network computing and storage resources for the analysis if needed for scalability and robustness. The correctness checking rule sets used for post-design-stage analysis may be similar to, and in some cases expressed using the same kinds of programming languages, as the correctness specifications used for design-stage correctness verification. As such, in scenarios in which correctness is already being checked in the design stage, correctness checking may be extended fairly easily to various other application lifecycle stages; in effect, correctness checking may become an integral component throughout the design, development, testing, and production use of distributed applications. By incorporating correctness checking techniques throughout the applications' lifetimes, hard-to-detect (e.g., timing-dependent) bugs may be identified and fixed more quickly, thereby leading to improved user experiences of clients of the distributed applications. Note that while the use of the proposed techniques may in general help to find more correctness violations than would be identified by conventional methods (such as design-stage model checking and thorough testing), the proposed techniques are of course not expected to identify all the bugs that may be present in large distributed applications in all cases.

As one skilled in the art will appreciate in light of this disclosure, certain embodiments may be capable of achieving various advantages, including some or all of the following: (a) increasing the probability that bugs in complex distributed applications are identified and fixed early on in the lifetimes of the applications, (b) reducing the overall frequency of failures of end users' request processing in production deployments of distributed applications, thereby enhancing end user experience; and/or (c) enabling software developers to gain better insights into distributed application behavior, thereby potentially helping improve the designs of new versions of the distributed applications.

According to some embodiments, a system may include one or more computing devices. The computing devices may include instructions that upon execution at the computing devices obtain, e.g., at a network-accessible distributed application correctness checking service (DACCS) of a cloud provider network, a plurality of correctness checking specifications for a distributed application. The distributed application may comprise a plurality of constituent services or other similar asynchronously interacting subcomponents. A particular correctness checking specification may pertain to one or more constituent services, and may for example indicate an expected response of a first constituent service to a particular event (e.g., a reception of a message from another constituent service at a time when the first constituent service is in a particular state) during execution of the distributed application. The correctness checking specifications may also be referred to as correctness checking rule sets, with each set comprising one or more rules.

In various embodiments, corresponding to at least a portion of a particular execution (e.g., the execution of the application in response to a particular set of client requests received during some time interval) of the distributed application at a resource set, respective groups of timestamped log records generated at individual constituent services of the plurality of constituent services may be collected. A first group of timestamped log records may for example be generated at a first resource of the resource set, and a second group of timestamped log records may generated at a second resource of the resource set at least partly concurrently with the first group. That is, in some cases, at least a particular timestamped log record of the second group may have a timestamp which is (a) later than a timestamp of a first timestamped log record of the first group and (b) earlier than a timestamp of a second timestamped log record of the first group. Note that in general, the log records may be generated at numerous different hardware servers and/or software stacks at which the various constituent services are implemented, and that not all the clocks from which the timestamps are obtained need be synchronized; in some embodiments, respective uncertainty ranges associated with the timestamps may be employed during analysis of the log records as discussed below.

From the respective sets of timestamped log records, an aggregated or consolidated event record sequence corresponding to the portion of the particular execution may be generated using a log-records-to-events mapping in some embodiments. A given event record of the aggregated event record sequence may indicate an occurrence of an event referenced in a correctness checking specification which was obtained earlier at the network-accessible service, as well as one or more responses of one or more constituent services to the event. In some embodiments, a respective timestamp may be assigned to individual ones of the event records, and the aggregated sequence may be sorted based on such event-level timestamps. The number of event records generated from a given number of log records may vary in different embodiments: in some cases, a given event record may be generated from multiple timestamped log records, while in other cases, a single timestamped log record may generate multiple event records, or a single timestamped log record may generate a single event record. In at least some embodiments, one or more parsers for the timestamped log records may be obtained at the service, e.g., via programmatic interfaces from developers/designers of the distributed application, and used to generate the event records from the log records.

From among a set of correctness checkers configured for the distributed application, a particular correctness checker may be selected by an event record filtering manager for analyzing one or more event records of the aggregated event record sequence in various embodiments. One or more such correctness checkers may be established for each correctness specification or rule set in some embodiments. The particular correctness checker may analyze the one or more event records, in view of the relevant correctness checking specification(s) or rule set(s), to determine whether a specification was violated by the one or more event records. If a violation is detected (or if it is determined that the probability that a violation occurred exceeds a threshold), an action responsive to the violation may be initiated. For example, a report or indication of the violation may be transmitted or provided via a programmatic interface, the execution of the distributed application may be paused or terminated, and so on, depending on violation response settings of the distributed application. Note that in some embodiments in which the correctness of the behavior of the application is checked at the DACCS using cloud provider network resources, at least a portion of the distributed application may be executed using resources external to the provider network.

In at least some embodiments, a correctness checking specification which is used to analyze the event records generated from log records during execution of the distributed application may also have been utilized earlier during a design phase or design stage of the distributed application. For example, correctness of a state machine model of at least a portion of the distributed application may have been checked or verified during the design phase using the same specification which is later used during the execution of the application.

In one embodiment, a request for run-time analysis of the distributed application may be received at the application correctness checking service, e.g., from an owner or administrator of the application via a programmatic interface, and the workflow of correctness checking operations (e.g., collection of log records, creation of the event record sequence from the log records, etc.) may be initiated in response to such a request.

As indicated earlier, in some embodiments, the clocks used for generating log record timestamps at different resources used during the execution of the distributed application may not necessarily all be synchronized. In one embodiment, an indication of an uncertainty range associated with respective groups of timestamps may be obtained at the DACSS via a programmatic interface, e.g., from a client on whose behalf correctness of an application is to be performed. From the uncertainty ranges associated with log record timestamps, uncertainty ranges for the corresponding event records may be determined. During analysis of the event records, the uncertainty range information may be used, for example, to determine different possible or potential time sequences of the events represented in the event records. The different possible/potential time sequences may then be examined separately to determine whether any of them would have violated a correctness specification or rule set. If at least some of the time sequences indicated a violation, a responsive action may be initiated in various embodiments—e.g., a notification indicating that a violation may have occurred (if the uncertainty in timestamps is taken into account) may be generated.

According to some embodiments, a partitioning policy may be employed to distribute the work of analyzing application correctness. For example, each log record may include a value of a partitioning key (comprising one or more fields of the log record, such as an identifier of a data store item which is being accessed as part of the distributed application), and the partitioning keys may be used to select the particular correctness checker to which an event generated from the log record is to be transmitted for analysis. Similar partitioning techniques may be used for distributing event record sequence filtering operations among a plurality of filtering managers—e.g., event records with partitioning keys that map (via a hash function) to a first value may be sent to a first filtering manager, and event records with partitioning keys that map to a second value may be sent to a second filtering manager.

The DACCS may implement a set of programmatic interfaces in various embodiments, such as one or more web-based consoles, command-line tools, graphical user interfaces, APIs and the like, which may be used to clients (such as application developers, application owners/administrators, etc.) to submit metadata, artifacts and preferences pertaining to various phases of the correctness checking workflow. For example, using such interfaces, an indication of one or more of the following may be provided in some embodiments: (a) an action to be initiated in response to a detection of a violation of one or more correctness checking rule sets, (b) the correctness checking rule sets, (c) a log analysis/parsing algorithm to be used to generate event records from log records, (d) a workload distribution algorithm for verifying correctness of the distributed application, (e) a parallelization policy for verifying correctness of the distributed application, and/or (f) a buffering algorithm to be used to group log records for event record generation and analysis. In some embodiments, a graphical interface of the DACSS may be used to present (e.g., in real time) a respective status of one or more stages of a multi-stage correctness analysis workflow of a distributed application. The multi-stage correctness analysis workflow may comprise, for example, (a) a log records collection stage, (b) an event record generation stage, (c) an event record filtering stage, and/or (d) a correctness checking stage.

Note that the distributed application correctness analysis techniques described herein may be agnostic with respect to the hardware or software used for different portions of the distributed application in at least some embodiments. For example, respective constituent services of the distributed application being analyzed may have been written in any desired programming languages, and may be executed at computing devices with any desired hardware architecture and any desired software stack (including any of various operating systems, virtualization managers, etc.). Different portions of the correctness analysis workflow may itself be performed using any desired hardware and software combination—e.g., parsers for log records may be written in one language and run on one type of server, correctness checkers may be written in another language and run on a different types of server, and so on.

As indicated above, a DACCS at which the techniques introduced above are employed may be implemented at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

FIG. 1 illustrates an example system environment in which a distributed application correctness checking service may be employed for analyzing large-scale applications which are implemented as collections of interacting constituent services, according to at least some embodiments. As shown, system 100 comprises resources and artifacts of a distributed application correctness checking service (DACCS) 120 which may be employed for analyzing various applications running at a distributed computing environment 102. A distributed application whose correctness is to be analyzed may for example be implemented as a collection of constituent services (CSs) which communicate with one another asynchronously using messages sent over network paths. In some embodiments, as indicated earlier, a distributed application may itself be structured as a network-accessible service to which clients can submit application transaction requests (e.g., HyperText Transfer Protocol (HTTP) requests) via programmatic interfaces (such as web services interfaces) and receive corresponding responses.

The set of messages that may be transmitted among the CSs of an application (and the sequence of the messages relative to one another) may in general vary depending on the particular kind of transaction or workflow being performed in response to a request from a client of the application, as well as on factors such as whether failures/delays are encountered during the execution of the transaction or workflow. The reception or transmission of a given message may represent an event which can trigger a change of state of one or more CSs in the depicted embodiment. Application correctness rules or specifications for the distributed applications may indicate expected or approved responses to such events at various CSs in the depicted embodiment.

An example asynchronous message/event graph 152 for execution of one particular transaction of a distributed application is shown in FIG. 1. The types of messages/events that occur during the execution of the transaction are indicated in the legend below the graph 152. For the transaction being considered, respective sets of operations may be performed at seven CSs; CS 110A, CS 110B, CS 110C, CS 110D, CS 110E, CS 110F, and CS 110G. Respective inter-CS requests (ICRs) may be sent from CS 110A to CS 110B, CS 110E and CS 110F. CS 110B may in turn submit inter-CS requests to CS 110C and CS 110D, and send a response to CS 110A's request after responses are received from CS 110C and CS 110D. In some cases, CS 110A may need to obtain responses to some of the requests originating at CS 110A before subsequent requests can be sent from CS 110A; in other cases, multiple requests may be sent from CS 110A to other CSs at least partly in parallel. For example, depending on the nature of the transaction being attempted, CS 110A may have to wait for a response from CS 110B (which in turn may have to wait for responses from CS 110C and CS 110D) before sending a request to CS 110E; in other cases, the request from CS 110A to CS 110E may be sent prior to receiving a response at CS 110A from CS 110B. CS 110E may send a response to CS 110A. CS 110F, on receiving a request from CS 110A, may send an inter-CS request to CS 110G. IN response to a retry-triggering condition, such as the expiration of a timeout pertaining to the request sent to CS 110G, or an error message indicating that CS 110G is unable to respond to the initial request from CS 110F, a retry for an ICR may be attempted by CS 110F in the depicted example graph—e.g., a copy of the same request which was sent to CS 110G may be re-sent to CS 110G. Eventually a response from CS 110F may be received at CS 110A, and the transaction may be completed in the scenario shown in FIG. 1.

The behavior of individual CSs may be modeled as a respective state machine in some embodiments, with some initial state being defined for each CS, and transitions between states being triggered by events. A given event may correspond to the reception of one or more messages from another CS, or in some cases may be triggered using the logic being implemented at the CS itself (i.e., without requiring the reception of a message from some other CS).

In at least some embodiments, correctness checking rule sets 122 (also referred to as correctness checking specifications), indicating the desired/expected (and/or undesired) responses of one or more CSs of a distributed application to one or more events, may be obtained at the DACCS 120 for various distributed applications. Such rule sets or specifications may in some cases already have been used to check correctness of state machine models of the application (or models of individual CSs) during the design of the application.

During a period of execution of a given distributed application, e.g., using resources of a test environment or production environment, log records of actual application behavior may be collected and processed in the depicted embodiment to detect possible violations of the rule sets 122. A set of application behavior records processing managers 124 may for example be configured for a given application, and used to accumulate/buffer timestamped log records from various resources at which respective portions of the application are run. The application behavior records processing managers 124 may be responsible, among other tasks, for mapping log records to the events which are indicated in the correctness checking rule sets, combing/consolidating/sorting event records generated from the mappings, and so on. The application behavior records processing managers may include a group of filtering managers and correctness checkers in some embodiments. The filtering managers may direct respective subsets of the accumulated event records to individual correctness checkers at which the event records can be examined to detect possible violations of the rules/specifications in the depicted embodiment. If such violations are detected (or if the probability of an occurrence of a violation is found to exceed a pre-selected threshold), responsive actions may be initiated in the depicted embodiment—e.g., application owners/developers may be notified regarding the violations, the execution of the application may be paused/terminated until a bug which caused a violation has been corrected, the permitted workload level of the application may be throttled, and so on. In some embodiments, if a violation of a correctness rule or specification is detected, the application's execution may be allowed to proceed, but further checking of the violated rule may be avoided until the bug or problem that led to the violation has been identified or fixed. A set of correctness checking status and results presentation managers 126 may provide ongoing metrics (e.g., how many log records have been received and processed thus far, how many event records have been generated and processed thus far, etc.) via programmatic interfaces of the DACCS during the analysis of the applications' executions in the depicted embodiment, and provide results of the analysis in at least some embodiments as well.

In some cases, requests for analyzing the correctness of a specified distributed application may be received via programmatic interfaces at the DACCS, and such requests may lead to the collection and analysis of the behavior records. The clocks used to generate the timestamps of the log records may not all be synchronized in some embodiments; uncertainty ranges associated with the timestamps as a result of such unsynchronized clocks may be used during the analysis in at least one embodiment (e.g., to generate several possible sequences of events and check the different possible sequences for correctness rule violations). In some embodiments, the DACCS may be implemented at a cloud computing environment or provider network, but at least a portion of a distributed application analyzed via the DACCS may itself be run at resources external to the cloud computing environment. Partitioning schemes may be used to parallelize various aspects of the correctness analysis workflow—e.g., keys includes in the log records may be used to divide the log records into partitions, and analysis of different partitions (e.g., the mapping of log records to event records, the filtering of event records, and/or the correctness checking operations on the filtered event records) may be performed in parallel.

Clients of the DACCS (such as application developers/testers during the test phase of the application, or application owners/deployment managers during production)

may specify metadata and preferences for various aspects of the analysis via programmatic interfaces in various embodiments, such as the rule sets/specifications, parsing logic to be used for log records, mappings between log records and events, partitioning policies, parallelism preferences, limits on resources to be expended during the analysis, etc. The DACCS may be agnostic with respect to the programming languages, hardware architectures and/or software stack choices made at the distributed applications in various embodiments—e.g., the same type of analysis may be performed regardless of the hardware, software or programming languages used for various CSs.

Figure 2:
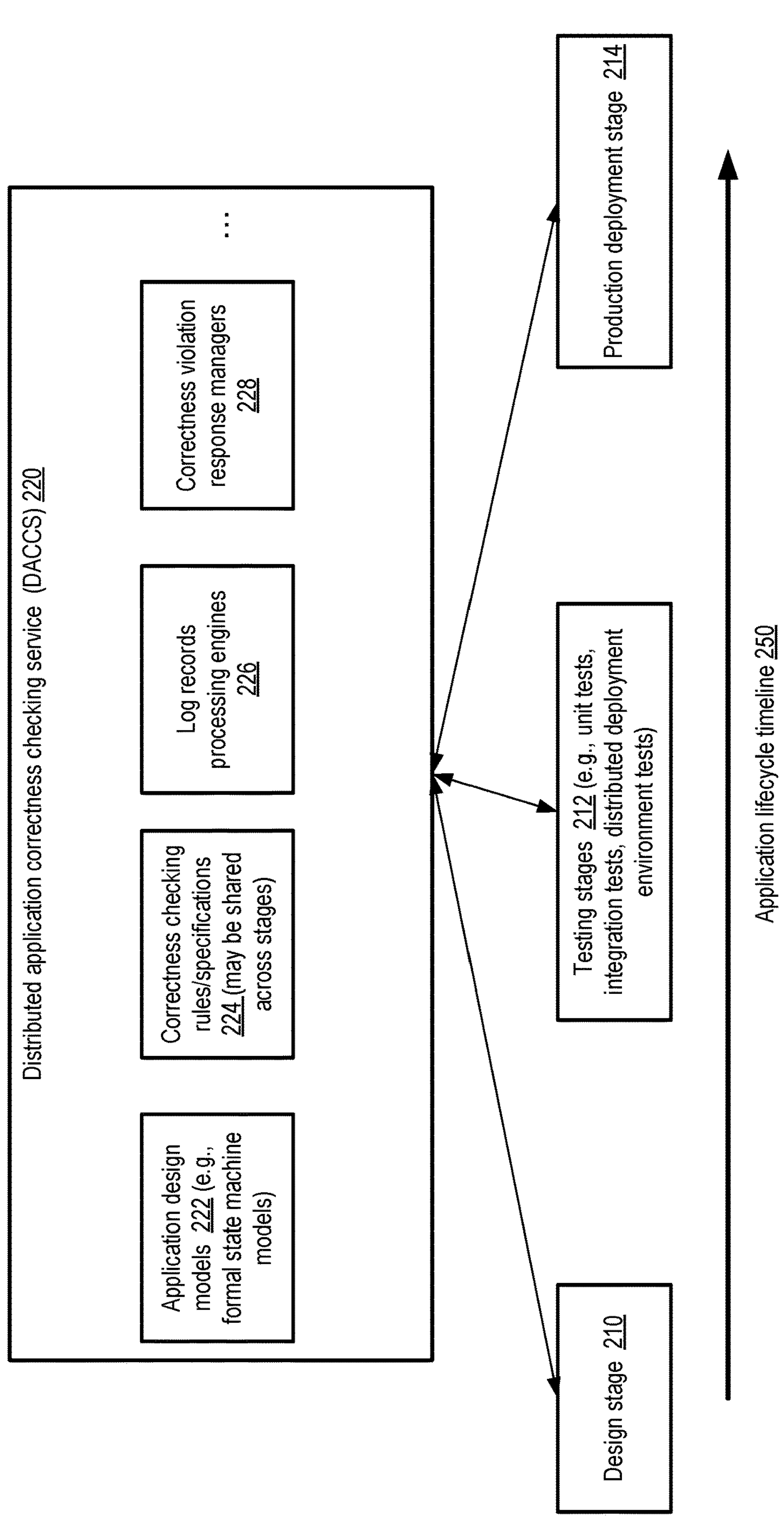
FIG. 2 illustrates example stages of an application's lifecycle in which correctness checking may be performed using a unified framework, according to at least some embodiments.

FIG. 2 illustrates example stages of an application's lifecycle in which correctness checking may be performed using a unified framework, according to at least some embodiments. Application lifecycle timeline 250 for a distributed application to be analyzed for correctness proceeds from left to right in FIG. 2, with a design stage 210 following by one or more testing stages 212 and a production deployment stage 214 in which the requests from clients of the distributed application are processed.

A DACSS 220 may be used during one or more of the stages shown along timeline 250 in the depicted embodiment. During the design stage 210, application design models 222 (e.g., formal state machine models expressed using a language such as P, TLA+ or PlusCal) may be obtained at the DACCS, e.g., from application designers/developers. Correctness checking rules/specifications 224 (which may also be expressed using similar languages) may be obtained as well in the depicted embodiment for the targeted distributed application. Log records processing engines 226 may collect and process timestamped log records from the resource used for executing the applications during post-design stages such as testing stages 212 and production deployment stage 214 in the depicted embodiment. Correctness violation response managers 228 of the DACCS may be responsible for initiating various types of actions (e.g., specified in advance by the DACCS clients) if violations of the rules/specifications are detected during by the processing engines. The log records processing engines and the correctness violation response managers may each be implemented using some combination of hardware and software in various embodiments.

The correctness checking rules/specifications 224 may only have to be created once (e.g., in, or prior to, the design stage) in the depicted embodiment, and then may be used and re-used during various stages of the application lifecycle. Multiple types of tests may be executed during the testing stages 212, such as unit tests, integration tests, distribute deployment environment tests, and so on, and the rules may be enforced/checked during each such stage, even if the rules were already checked during the design stage with respect to the application design models. The rules may also continue be checked after the distributed application is put into production use. The checking of the correctness of the application may thus be fully integrated into the application lifecycle, regardless of the stage of development of the application.

At least two types of correctness-related rule sets may be utilized in different embodiments: safety-related rule sets and liveness-related rule sets. At a high level, "safety" may be defined as a property which prevents undesired conditions or undesired states from being reached in the distributed application, while "liveness" may be defined as a property whereby a desired condition or desired state is eventually reached in then distributed application (i.e., that the application does not remain in an endless loop without reaching a desired state).

A trivial annotated example of correctness checking specifications or rule sets for safety and liveness, expressed using the P language, is provided below to illustrate the concepts involved. Note that correctness checking specifications or rule sets are likely to be much more complex for some distributed applications than the trivial example shown below. In this example, a distributed application pertaining to bank accounts is to be analyzed for correctness. Each bank account is set up for a respective client of the bank, and a client is to be allowed to withdraw money from their account as long as the amount of money left (if the withdrawal succeeds) is no less than a specified threshold 10. One specification, focused on the safety property, is named BankBalanceSafetyCheck. BankBalanceSafetyCheck attempts to ensure that that the account balance communicated to a client of the bank is correct, that the bank never deducts/removes more money from the account than was withdrawn by the client, and that a withdrawal request is denied only if the threshold condition indicated would be violated. A second specification, named WithdrawalLivenessCheck, focused on the liveness property, attempts to ensure that responses are eventually generated for each withdrawal request submitted by a client. (Note that the response could be a denial of the withdrawal if the threshold condition is not satisfied.) Each of the "on" statements (such as "on eWithDrawRec") in the example indicates an event whose occurrence has been detected, and the following code indicate correctness checking operations (typically structured as "assert" operations which result in messages being generated if a violation of correct or expected behavior is detected).

——————————Annotated Simple Example of Liveness and Safety Specification Begins——————————

```
// define event for initialization of the specification
event eSpec_BankBalanceSafetyCheck_Init: map[int, int];
// A request to withdraw money from an account is represented by an eWithDrawReq event,
// and a response to such a request is represented by an eWithDrawResp event
spec BankBalanceSafetyCheck observes eWithDrawReq, eWithDrawResp,
                                eSpec_BankBalance SafetyCheck_Init {
    // a mapping from account IDs to balances is used to keep track of
        var bankBalance: map[int, int];
    // a mapping from request IDs to withdrawal requests is used for pending withdrawals
        var pending WithDraws: map[int, tWithDraw Req];
        start state Init {
                        on eSpec_BankBalanceSafetyCheck_Init goto WaitForWithDrawReqAndResp
                            with (balance: map[int, int]){
                            bankBalance = balance;
                        }
        }
    state WaitForWithDrawReqAndResp {
            on eWithDrawReq do (req: tWithDrawReq) {
// the assert statements check correctness and generate messages on violation detections
                        assert req.accountId in bankBalance,
                            format ("Unknown accountId {0} in the withdraw request. Valid accountIds
= {1}", req.accountId, keys(bankBalance));
                        pendingWithDraws[req.rId] = req;
            }
            on eWithDrawResp do (resp: tWithDrawResp) {
                        assert resp.accountId in bankBalance,
                            format ("Unknown accountld {0} in the withdrawal response!",
resp.accountId);
                        assert resp.rId in pendingWithDraws,
                            format ("Unknown rId {0} in the withdraw response!", resp.rId);
                        assert resp.balance >= 10,
                            "Bank balance in all accounts must always be greater than or equal to 10 !! ";
                    if(resp.status == WITHDRAW_SUCCESS)
                    {
                        assert resp.balance == bankBalance[resp.accountId] -
                            pendingWithDraws[resp.rId].amount,
                            format ("Bank balance for the account {0} is {1} and not the expected value
{2}!",
                            resp.accountId, resp.balance, bankBalance[resp.accountId]
pendingWithDraws[resp.rId].amount);
  // update the account balance
                        bankBalance[resp.accountId] = resp.balance;
                    }
    else {
            // bank can only reject a request if it will drop the balance below 10
                assert bankBalance[resp.accountId] - pendingWithDraws[resp.rId].amount < 10,
                    format ("Bank must accept the withdrawal request for {0}, bank balance is {1}!",
                    pendingWithDraws[resp.rId].amount, bankBalance[resp.accountId]);
                // if withdrawal failed then the account balance must remain the same
                assert bankBalance[resp.accountId] == resp.balance,
                    format ("Withdrawal failed but the account balance changed! actual: {0}, bank
  indicated: {1}",
                        bankBalance[resp.accountId], resp.balance);
                }
            }
    }
}
spec WithDrawalLivenessCheck observes eWithDrawReq, eWithDrawResp {
    // track pending withdrawal requests
        var pendingWDReqs: set[int];
        start state NopendingRequests {
                on eWithDrawReq goto PendingRegs with (req: tWithDrawReq) {
                        pending WDReqs += (req.rId);
                }
        }
// remaining in a "hot" state increases the "temperature" of the system; after the
// temperature reaches a threshold, an error is thrown to indicate that the system is not
// satisfying liveness
        hot state PendingReqs {
            on eWithDrawResp do (resp: tWithDrawResp) {
                    assert resp.rId in pendingWDReqs,
                        format ("unexpected rId: {0} received, expected one of {1}", resp.rId,
pending WDReqs);
                pendingWDReqs -= (resp.rId);
                if(sizeof(pendingWDReqs) == 0) // all requests have been processed
                    goto NopendingRequests;
```

-continued

```
            }
            on eWithDrawReq goto PendingReqs with (req: tWithDrawReq){
                    pendingWDReqs += (req.rId);
            }
        }
}
```

——————————Annotated Simple Example of Liveness and Safety Specification Ends——————————

Figure 3:
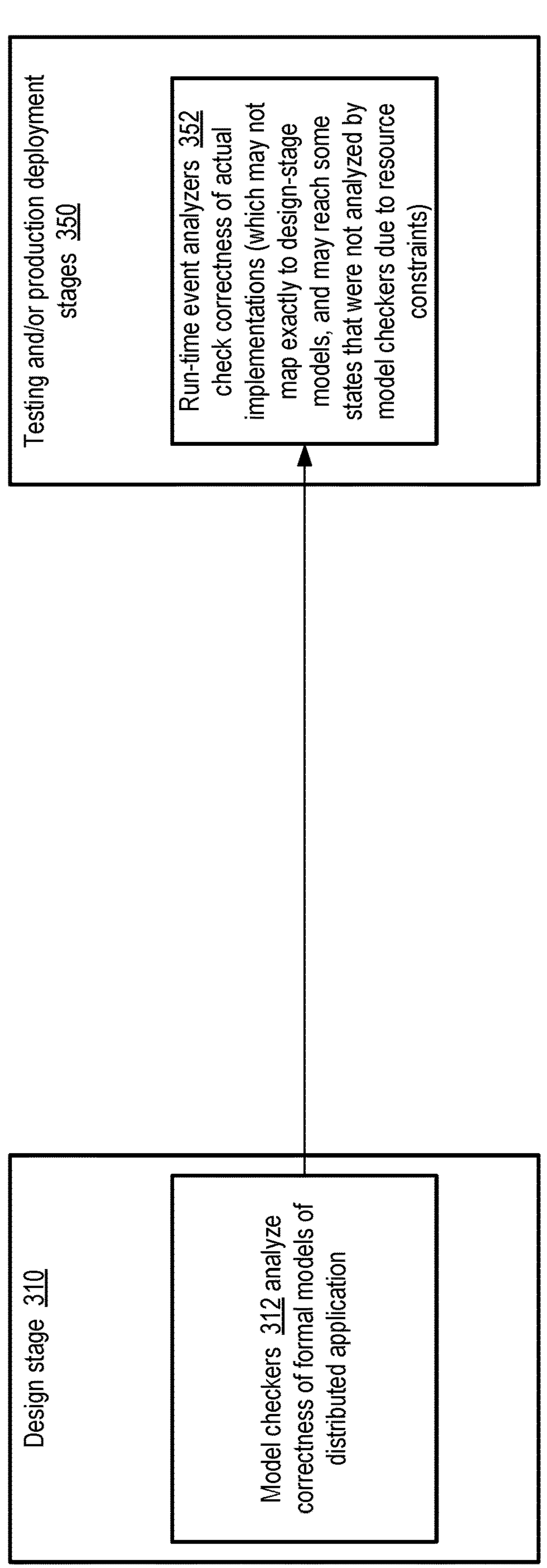
FIG. 3 illustrates the example use of model checkers during an application's design, and the use of run-time event analyzers in post-design phases, for verification of application correctness, according to at least some embodiments.

FIG. 3 illustrates the example use of model checkers during an application's design, and the use of run-time event analyzers in post-design phases, for verification of application correctness, according to at least some embodiments. In the design stage 310 of a distributed application, model checkers 312 may analyze correctness of formal models of the application as indicated above. However, success in checking the models may not translate to removal of some bugs that for several reasons. Firstly, the models created for evaluation of the design may not match the actual code that is written for the application, so there may be a mismatch between the checked models and the implemented version of the application. Secondly, the model checkers may only have a limited amount of memory and computing resources available for their analysis, and some states of the distributed application may not be reached before the checking is terminated. Note that model checkers represent one example of design-time analysis of correctness; in some embodiments, other techniques such as theorem proving may be employed at design time. The limitations associated with using model checkers may apply to such alternative techniques as well. In the remainder of this description, the terms "model checkers" and "model checking" are used generically as proxies to refer to various such design-phase correctness analysis techniques.

Accordingly, in various embodiments, run-time event analyzers 352 (e.g., included among the application behavior records processing managers 124 of FIG. 1, or among the log records processing engines 226 of FIG. 2) may be deployed to check the correctness of the actual implementations of the application in testing and/or production deployment stages 350. The run-time analysis performed in post-design phases may be stateful in at least some embodiments, in that state information pertaining to some collection of related events (and corresponding event responses) may be maintained and used to check for correctness of the application behavior. As such, the event analyzers 352 may consider multiple events as a group in at least some cases, and not just check for the occurrences of correct or expected responses to individual events. Note that while model checkers may be used to verify compliance with correctness checking specifications in the design stage in some embodiments, the use of such model checkers may not be a prerequisite for checking correctness after the design phase in at least some embodiments. For example, correctness checking rule sets may in some cases be created after the design of the application is completed, and employed starting with a testing stage of the application, or even starting with the production deployment stage.

Figure 4:
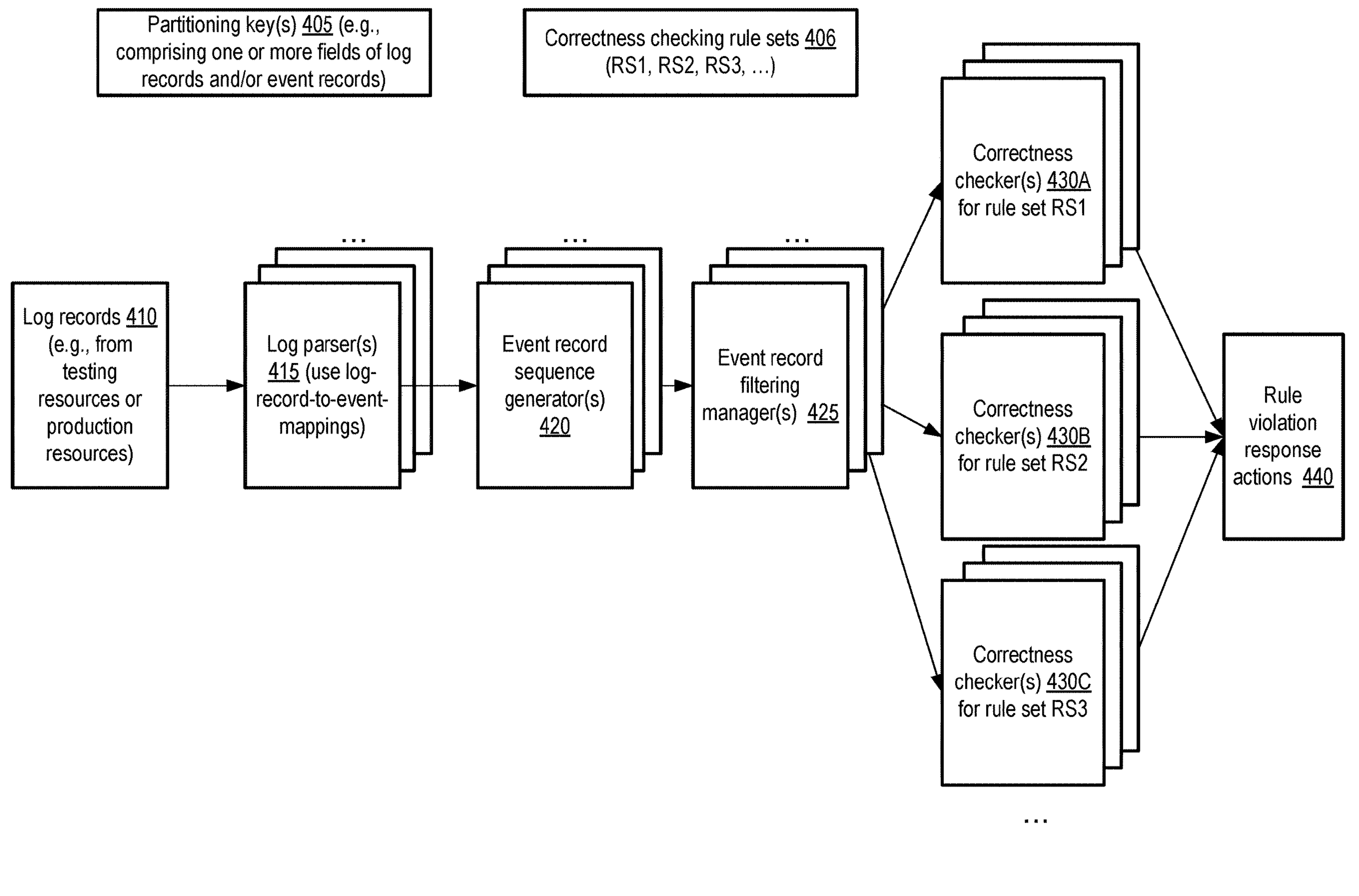
FIG. 4 illustrates example components of a pipeline for checking application behavior correctness after the design phase, according to at least some embodiments.

FIG. 4 illustrates example components of a pipeline for checking application behavior correctness after the design phase, according to at least some embodiments. The source code of various constituent services of a distributed application may be instrumented to generate log records 410 that can indicate occurrences of events indicated in correctness checking rule sets for the application in the depicted embodiment. In some cases, the developers of the application may generate the correctness checking rule sets 406 (such as RS1, RS2, RS3, etc.) and insert corresponding calls to a logging library as part of programming best practices. In at least one embodiment, after correctness checking rule sets have been created, an automated tool may be used to analyze the source code of at least a portion of the source code of the application to verify that the code has been instrumented to generate the appropriate log records, and the developers may be notified if additional logging is needed. In some embodiments, log record generating code for correctness checking may be automatically inserted into the application components by a tool of the DACCS (e.g., in the form of incomplete templates or stubs which have to be filled in by developers in order for the code to be compiled or run successfully).

In the embodiment depicted in FIG. 4, one or more log parsers 415 may be used to initiate processing of the log records 410 generated from testing resources or production resources of the application at which constituent services are run. A given constituent service may itself run on several different resources of the overall resource set used for the distributed application in some embodiments, and log records pertaining to that constituent service may be collected from multiple resources. The log parsers 415, event record sequence generators 420, event record filtering managers 425 and correctness checkers 430 of the pipeline shown in FIG. 4 may each comprise one or more processes running on one or more computing devices in the depicted embodiment. Code for parsing the log records may be provided by the developers of the application in some embodiments. In at least some distributed applications, occurrences of events of interest for correction checking may be identified from one or more log records, and the log records may each comprise fields which can be used to partition or parallelize the work of analyzing correctness. For example, in a scenario in which the application comprises writes and reads directed to records stored at a storage service, each such write or read may indicate a unique record identifier (the identifier of the record being read or written), and such record identifiers can be used as a partitioning key 405. In one implementation, for example, the record identifier may be provided as input to a hash function, and the output of the hash function may identify a partition. The partition identifiers (and/or the partitioning keys themselves) may be included in event records generated at the log parsers 415 using a log-records-to-event-records mapping provided by the application developers in some embodiments. In some embodiments, there may be a 1-to-1 relationship between log records and events indicated in the correction rule sets; in other embodiments, some log records may be mapped to several different events, or multiple log records may be mapped to a single event. In some embodiments, a log records buffering parameter may be selected, e.g., by a DACCS client on whose behalf an application is to be analyzed, indicating the time period for which log records should be collected and parsed before the corresponding event records are sent on to the event record sequence generators and other parts of the pipeline. In at least one embodiment, a given event record may indicate not just the occurrence of a particular event, but also a response of one or more constituent services to the occurrence of that particular event; such responses may be used to evaluate the correctness of the behavior of the constituent services.

Individual ones of the log records 410 may comprise timestamps generated using the clocks at the resources at which the log records are created in the depicted embodiment. In some embodiments, especially in scenarios in which the distributed application is being run using dozens or hundreds of servers, not all the local clocks at the servers may be synchronized. As a result, some uncertainty may be associated with the timestamps in such embodiments—e.g., when arranging log records in timestamp order, the sequence in which log records from resources with unsynchronized clocks should be positioned relative to one another may not be unambiguous. In at least one embodiment, an uncertainty range associated with timestamps generated at the log record sources may be provided to, or assumed by, the DACCS, and this uncertainty range may be used during the analysis of event records to check correctness. For example, multiple potential event sequences may be generated from a given set of event records, and each such potential events sequence may be analyzed for correctness independently. If some of the potential sequences indicate correctness violations but others do not, notifications indicating that the violations could have (but may not necessarily) occurred during the execution of the program may be generated and provided to the DACCS client on whose behalf the application is being analyzed in the depicted embodiment.

In scenarios in which the relationship between timestamped log records and events is not 1-to-1, the log parsers may include logic to assign timestamps to the event records. For example, if N log records are mapped to a single event record, in one embodiment the earlier timestamp among the N log records may be chosen as the timestamp for the event record.

An unsorted set of event records generated by the log parser(s) may be converted into timestamp-sorted set by one or more event record sequence generators 420 in the depicted embodiment. In some embodiments in which the log records comprise partitioning keys, and different partitions of the overall log events can be analyzed independently for correctness, per-partition event record sequence generators may be set up, thereby enabling parallelism during the event record sequence generation phase of the analysis.

One or more event record filtering managers 425 may analyze the sorted event sequence(s) (either respective sequences for each partition, or a global event record sequence), and distribute the appropriate subset of event records to each of several correctness checkers. For example, correctness checkers 430A may be set up for checking for violations of rule set RS1, correctness checkers 430B may be set up for checking for violations of rule set RS2, correctness checkers 430C may be set up for checking for violations of rule set RS3, and so on. In some embodiments, at least two kinds of parallelism may be employed for correctness checking. Firstly, potential violations of different rule sets RS1, RS2, etc., may be checked in parallel. Secondly, with respect to a given rule set, different partitions of the event records may be analyzed in parallel. The use of parallelism at various stages of the pipeline shown in FIG. 4, including the log parsing phase (in which the overall stream of log records may be subdivided for analysis by multiple parsers), the event record sequence generation phase, the event filtering stage, and the correctness checking stage, may enable the behavior of applications running at hundreds or thousands of computing devices to be analyzed rapidly in the depicted embodiment. In various embodiments, one or more rule violation response actions 440 (such as transmission of notifications, pausing application execution, etc.) may be initiated if/when the correctness checkers detect violations of one or more rule sets. In some implementations, only a few seconds or a few minutes may pass between the time that a correctness violation occurs and the time that the violation is detected, thereby achieving near real-time correctness checking of large-scale production environments. Note that some DACCS clients may not require real-time correctness checking, so the analysis may be deferred and performed offline relative to the time period of execution of the application during which log records used for the analysis are collected.

In some embodiments, the order in which the operations of the application correctness checking pipeline are executed may differ from the order depicted in FIG. 4, and/or some of the operations may not be required. For example, filtering may be performed before global event record sequences are generated in one embodiment. In another embodiment, or a global event record sequence may not be generated at all. In one embodiment, some of the rule violation response actions 440 may be used as feedback into earlier stages of the pipeline—e.g., if a particular rule violation is detected with respect to some set of events starting at a time T1, more detailed or repeated analysis and checking of a different set of events that occurred shortly before T1 may be initiated, the sequencing of events that led up to the detected violation may be re-checked, alternative sequences may be explored if there is some uncertainty about the exact ordering, and so on. Note that depending on the nature of the specific correctness checking rules being used, sequencing of the event records may not be required in some cases; for example, some correctness rules may be violated if a particular set of responses occurs at the application to a corresponding set of events, regardless of the sequence of those events. In at least some embodiments, instead of timestamps, sequence numbers (or more generally monotonically increasing numbers) which are not necessarily directly related to wall-clock time or computer-maintained clock values may be used.

Figure 5:
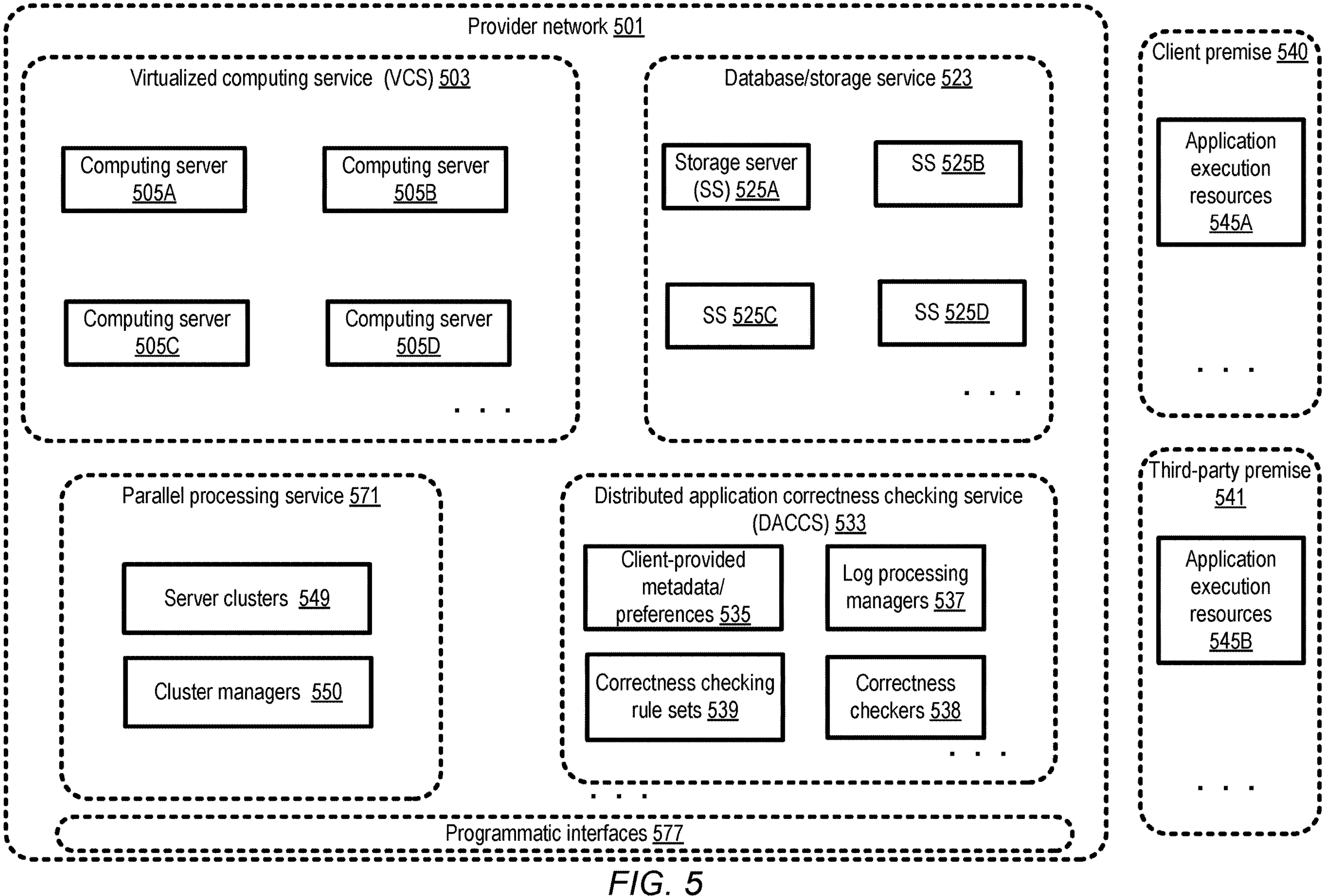
FIG. 5 illustrates an example scenario in which a distributed application correctness checking service may be implemented at a cloud provider network, according to at least some embodiments.

In some embodiments, as mentioned earlier, a DACCS that can be utilized to analyze correctness of distributed applications during various stages of the applications' lifecycles may be implemented as part of a cloud provider network or cloud computing environment. FIG. 5 illustrates an example scenario in which a distributed application correctness checking service may be implemented at a cloud provider network, according to at least some embodiments. In the depicted embodiment, provider network 501 may comprise resources used to implement a plurality of network-accessible services, including for example a virtualized computing service (VCS) 503, a database/storage service 523, a parallel processing service 571 as well as DACCS 533. The DACCS 533, similar in features and functionality to DACCS 120 of FIG. 1, may include log processing managers 537 and correctness checkers 538, and may store correctness checking rule sets 539 and client-provided metadata/preferences 535 for various aspects of correctness checking pipelines of the kind shown in FIG. 4. In some cases, the distributed applications whose correctness is to be analyzed may themselves be run using provider network resources. For example, some of the business logic of a distributed application may be run at computing servers 505 of the VCS, such as computing server 505A, 505B, 505C or 505D. Data being accessed as part of the distributed application may be stored at storage servers of the database/storage service 523, such as SS 525A, 525B, 525C or 525D. For some distributed applications, servers clusters 549 of parallel processing service, orchestrated using cluster managers 550, may be employed. In at least one embodiment, resources external to the provider network may be used to run portions (or all) of the distributed applications whose correctness is to be analyzed. For example, application execution resources 545A at a client premise 540 (e.g., a data center of the client on whose behalf the application is to be analyzed) may be used to run part or all of the targeted application whose correctness is to be checked, and/or application execution resources 545B at a third-party premise 541 (a premise which is not part of the provider network, and is not owned by the client requesting the analysis) may be used to run part or all of the targeted application.

Components of a given service of a provider network may utilize components of other services in the depicted embodiment—e.g., for log processing or correctness checking tasks, virtual machines or compute instances implemented at computing servers such as 505A-505D of the virtualized computing service 503 may be used by DACCS 533, log records and/or event records may be stored at storage servers of the database/storage service 523, and so on.

Individual ones of the services shown in FIG. 5 may implement a respective set of programmatic interfaces 577 which can be used by external and/or internal clients (where the internal clients may comprise components of other services) in the depicted embodiment. In at least some embodiments, resources of a cloud provider network may not be required for the kinds of correctness analysis techniques introduced above; instead, for example, a standalone set of tools may be used.

A provider network 501 can be formed as a number of regions in some embodiments, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN (virtual private network) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, a DACCS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

The cloud provider network may implement various computing resources or services, which may include a DACCS, a VCS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

A VCS 503 of the cloud provider network may offer virtual compute instances (also referred to as virtual machines, or simply "instances") with varying computational and/or memory resources in various embodiments. In one embodiment, each of the virtual compute instances may correspond to one of several instance types or families, and instances of any of several families may be employed for the web information extraction model preparation and execution workflow. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. Various types of compute instances running at computing servers 505, some of which may have access to hardware accelerators (e.g., incorporated within cards connected via Peripheral Component Interconnect-Express (PCIe) links to the primary processors of virtualization servers at which the compute instances are run) may be used to perform correctness analysis of the kind described above in different embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Components of correctness analysis pipelines similar to the pipeline shown in FIG. 4 may be run using containers in at least some embodiments.

The traffic and operations of the cloud provider network, and individual services such as the DACCS, may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components of services such as the DACCS) may share the virtualized servers with the data plane, and control plane traffic and data plane traffic may be sent over separate/distinct networks.

FIG. 6 illustrates a distributed application correction checking service which is agnostic with respect to the programming languages, hardware architectures and software stacks used for implementing constituent services of the applications, according to at least some embodiments. In the depicted example scenario, a DACCS 605, similar in features and functionality to DACCS 120 of FIG. 1, is to be used to analyze the correctness of a distributed application 602. The application includes constituent services (CSs) 610A, 610B and 610C. Messages are sent from CS 610A to CS 610B, and from CS 610B to CS 610C, during execution of the application. The CSs 610A, 610B and 610C may in general include programs written in any desired programming language, and run at any desired software/hardware stack; from the perspective of the DACCS, the correctness checking technique introduced above may be employed regardless of the language or execution environment of the distributed application, as long as log records indicating the occurrences of events referenced in correctness checking rules can be obtained. For example, CS 610A may comprise code written in a language L1, run using servers with a hardware architecture HA1 and a software stack (including elements such as virtualization managers, operating systems etc.) SS1. CS 610B may comprise code written in a language L2, run using servers with a hardware architecture HA2 and a software stack SS2. CS 610C may comprise code written in a language L2, run using servers with a hardware architecture HA2 and a software stack SS2. CS 610C may comprise code written in L1, run using servers with a hardware architecture HA2 and a software stack SS3. DACCS 605 may be employed to check correctness of other distributed applications concurrently with checking the correctness of distributed application 602, and the other applications may use any desired language and execution environment as well.

Components of the DACCS itself may use different programming languages and hardware/software stacks in the depicted embodiment. For example, log parsers 630 (which may be provided by developers of the distributed application as mentioned earlier) may be written in a language L4, run on servers with hardware architecture HA4, and software stack SS4. Correctness checkers 635, for which code may also be provided by developers of the application 602, may be written in language L5, run on servers with hardware architecture HA5, and software stack SS5. Other components of the DACCS (such as event record sequence generators, filtering managers, etc.) may similarly be written in any desired language, and may be run at any desired execution environment in various embodiments.

Figure 7:
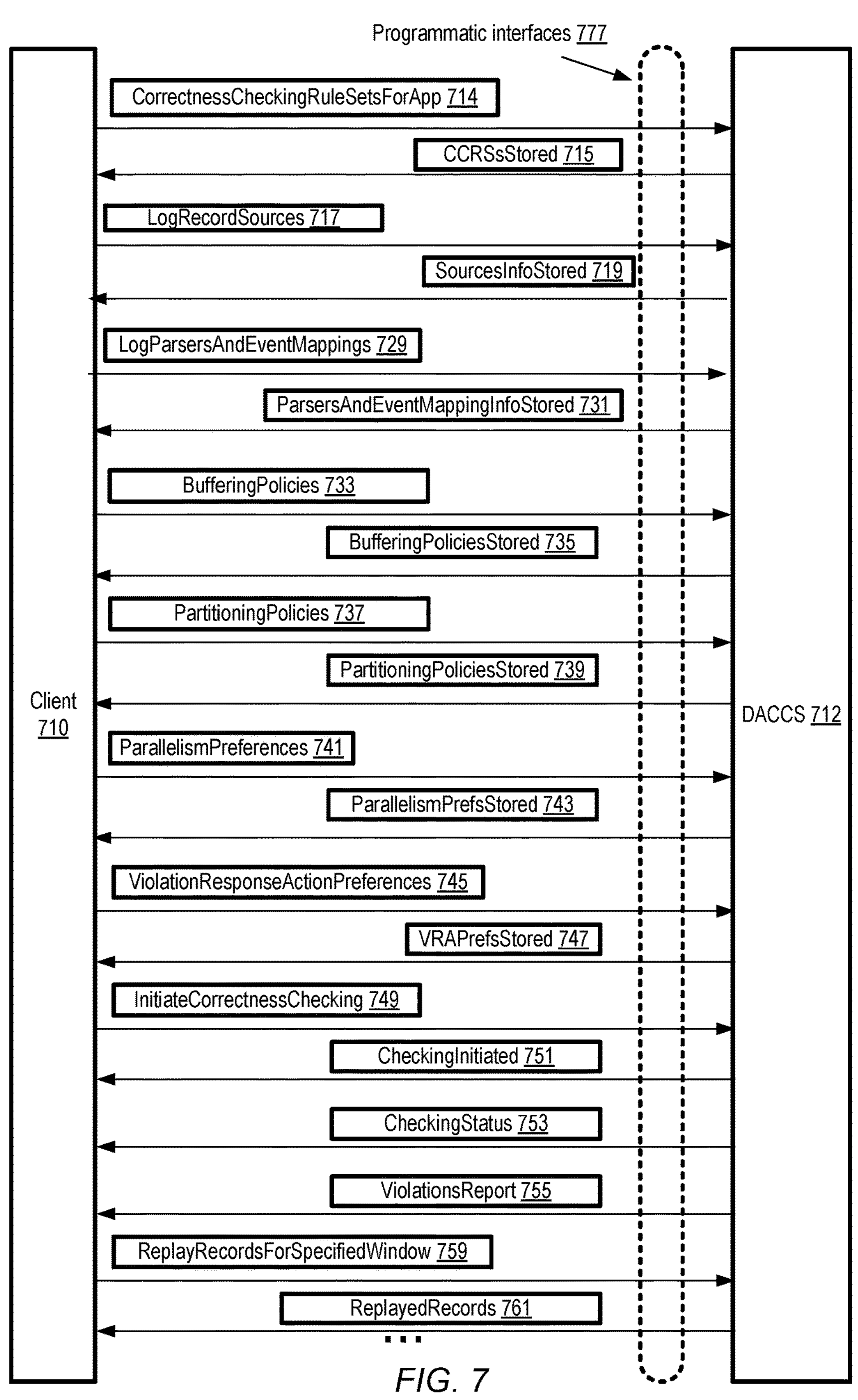
FIG. 7 illustrates example programmatic interactions between clients and a distributed application correctness checking service, according to at least some embodiments.

FIG. 7 illustrates example programmatic interactions between clients and a distributed application correctness checking service, according to at least some embodiments. A DACCS 712, similar in features and functionality to DACCS 120 of FIG. 1, may implement a set of programmatic interfaces 777 which can be used by clients 710 (such as owners, administrators, developers of distributed applications) of the DACCS to provide and obtain various types of information regarding application correctness checking in the depicted embodiment. The programmatic interfaces may include, for example, one or more web-based consoles, command line tools, graphical user interfaces, APIs and the like.

Using programmatic interfaces 777, a client 710 may submit a CorrectnessCheckingRuleSetsForApp message 714, indicating a set of rules for checking correctness of a particular targeted distributed application. The DACCS 712 may provide an indication of one or more supported programming languages (such as P, TLA+, PlusCal etc.) which can be used to express such rule sets, and the client may use any of the supported languages to specify the rule sets in the depicted embodiment. In some embodiments, a client may provide source code which can be executed to check whether the rules in the rule sets are violated by events detected during application execution. In other embodiments, the client may provide executable code for checking whether the rules are being followed. In one embodiment, the client may provide a pointer (e.g., network address) of a rule set checking program to which streams of log records or events detected during application execution can be directed by the DACCS. The information about the correctness checking rules may be saved at the DACCS and a CCRSs-Stored message 715 in the depicted embodiment.

One or more sources from which log records to be used for correctness analysis may be indicated by a client via a LogRecordSources message 717 in some embodiments. The log records sources may for example comprise log files stored at various resources at which constituent services of the targeted distributed application run. In at least one embodiment, an intermediary such as a streaming data management service (SDMS) may be used to collect log records, and the SDMS may be indicated as the source of the log records from the perspective of the DACCS. In some embodiments, access to the log records generated at some resources or SDMSs may require authorization credentials, and such credentials may be provided to the DACCS. In one embodiment in which the DACCS is implemented at a cloud provider network, at least some of the log record sources may be located within the provider network—e.g., some log records of interest may be generated at compute instances of a VCS of the provider network. In some embodiments, portions or all of the targeted distributed application may be executed at resources at premises other than the data centers of the provider network, such as office premises or data centers of clients of the DACCS, and at least some log records used for correctness analysis may be collected from sources at such external premises. The information about the log record sources may be saved at the DACCS, and a SourcesInfoStored message 719 may be sent to the client.

In at least one embodiment, a LogParsersAndEventMappings message 729 may be used by a client 710 to provide the logic to be used to parse log records and map the log records to events which can be analyzed using the correctness checking rule sets. Clients may provide source code or executable code for parsing the log records and extracting event sequences from the log records in different embodiments. A ParsersAndEventMappingsStored response message 731 may be sent to the client to indicate that the provided information about parsing the log records and generating events from the event records has been received at the DACCS.

In some embodiments, correctness checking may be performed in a batched manner, with a set of log records generated during some time interval being analyzed as a group, followed by analysis of another set pf log records generated during a subsequent time interval, and so on. The time intervals need not be disjoint in such embodiments—for example, in one batch, log records collected between times T0 and T1 may be analyzed, the next batch log records collected between (T0+ (T1−T0)/2) and (T1+(T1−T0/2)) may be analyzed, and so on. Parameters governing the buffering of log records for such batched analysis may be indicated by a client via a BufferingPolicies message 733 in the depicted embodiment. Such a message may indicate, for example, that log records generated within a time period of N seconds should be buffered for analysis, or that log records should be analyzed in groups of T thousand at a time. The buffering preferences of the client may be stored, and a BufferingPoliciesStored message 735 may be sent to the client in the depicted embodiment.

If the work of analyzing the application for correctness can be distributed among multiple correctness checkers, each of which can work on a respective logically-related partitions of the log records independently of the other correctness checkers, the client may specify a partitioning policy via one or more PartitioningPolicies messages 737 in the depicted embodiment. Note that the ability to independently analyze different partitions independently may depend on the rule sets defined for correctness checking; in some cases, the rule sets may be defined in such a way that it is not feasible to subdivide the log records into partitions that can be analyzed in isolation from one another. In those cases in which partitioning is feasible, the client may provide an indication of the partitioning keys to be used to distributed the log records (and corresponding event records) into the partitions. As indicated earlier, partitioning may be employed to distribute the analysis workload in several stages of a pipeline similar to the pipeline shown in FIG. 4, including the event sequence generation stage, the event filtering stage, and the correctness checking stage. In one embodiment, partitioning may also or instead be used during the log parsing stage. A PartitioningPoliciesStored message 739 may be sent by the DACCS to the client to indicate that the partitioning policies have been received and saved.

Partitioning may enable parallelized analysis of the correctness of the application behavior in various embodiments, as different partitions of the log records and event records may be analyzed in parallel. In some embodiments, even the workload corresponding to an individual partition may be parallelized, e.g., by launching multiple processes or threads that can each analyze a respective subset of the log records or event records of the partition. A ParallelismPreferences message 741 may be submitted by a client 710 indicating how many concurrent threads or processes can be used concurrently at various stages of the correctness analysis pipeline, and the DACCS may send back a ParallelismPrefs-Stored message 743 to the client in the depicted embodiment.

Clients may indicate preferences or requirements regarding the kinds of actions that should be initiated by the DACCS in the event that a violation of a correctness rule is detected, e.g., by submitting a ViolationResponseAction-Preferences message 745 in the embodiment shown in FIG.

7. In some cases, for example, the client may wish to be notified in the event of the detection of a violation, but may wish the DACCS to continue analyzing the application's subsequent behavior even after the violation is detected (e.g., to try to find additional bugs in the application. In other cases, the client may wish to be notified when a violation is detected, but may desire that the DACCS stop its analysis of the application immediately after the violation is detected. In some embodiments, the client may indicate that if a rule violation is detected, the execution of the application should be paused or terminated. In at least one embodiment, if and when the DACCS identifies a violation, which may be associated with the response of the distributed application to a particular event E1 or a particular log record LR1, the DACCS may be able to display a set of prior events or log records leading up to event or log record which led to the detection of the violation. For example, if an event at timestamp T was found to indicate a violation, events in a time window (T-delta, T) may be displayed to help the client gain insight into the context in which the violation occurred. The duration of the time window (expressed for example in time units such as seconds or milliseconds) or an event count window (expressed in units of the number of events/log records prior to the event/log record associated with the violation) may be indicated as a parameter in the Violation-ResponseActionPreferences message in some embodiments. Clients may, for example, request that events within a time window of N seconds or an event window of E events be displayed or presented if a correctness rule violation is found. After the client's preferences regarding the actions to be taken in the event of a violation are saved, a VRAPrefs-Stored message 747 may be sent to the client in some embodiments.

A client may submit an InitiateCorrectnessChecking request 749 to start the analysis of a targeted application (in accordance with the rule sets and other parameters indicated earlier by the client) in the depicted embodiment. In response, a pipeline comprising the appropriate set of log parsers, event sequence generators, event filtering managers, and/or correctness checkers may be assigned/activated for the targeted application, and a CheckingInitiated message 751 may be sent to the client when the pipeline starts collecting and processing log records. As the pipeline is executed for different sets of buffered log records, the status of the various stages of the pipeline may be provided via one or more CheckingStatus messages 753 in the depicted embodiment. If and when violations of the applicable correctness rule sets are detected, corresponding actions may be initiated by the DACCS, e.g., including sending Violation-sReport messages 755 to the client.

In one embodiment, the DACCS 712 may enable clients to replay records (e.g., log records or corresponding event records) collected/generated with respect to specified parts of the execution of the application. For example, consider a scenario in which a correctness violation is detected at some time T1 during an execution of the application. If a client wishes to try to debug the detected violation, the client may submit a ReplayRecordsForSpecifiedWindow request 759, indicating a time window (e.g., X seconds prior to T1) or an event window (e.g., Y events before the specific events that led to detection of the violation, or Z log records before the specific log records which led to the detection of the violation) for which events and corresponding responses are to be presented, so that the client is able to view the behavior of the application in detail prior to the violation. Such a replay can be considered analogous to time travel through the history of the execution of the distributed application. The DACCS may enable the client to examine the changes in state of various constituent services of the application during the specified window, e.g., via a sequence of ReplayedRecords messages 761.

In at least some embodiments, the DACCS may automatically scale the resources assigned to various stages of the correctness analysis pipeline—e.g., additional processes threads for log record parsing, event sequence generation, event filtering and/or correctness checking may be added if the rate of incoming log messages increases beyond a threshold, or some processes/threads for these stages may be terminated if the rate of incoming log records decreases. It is noted that other types of programmatic interactions pertaining to correctness analysis of distributed applications may be supported in some embodiments than those shown in FIG. 7.

Figure 8:
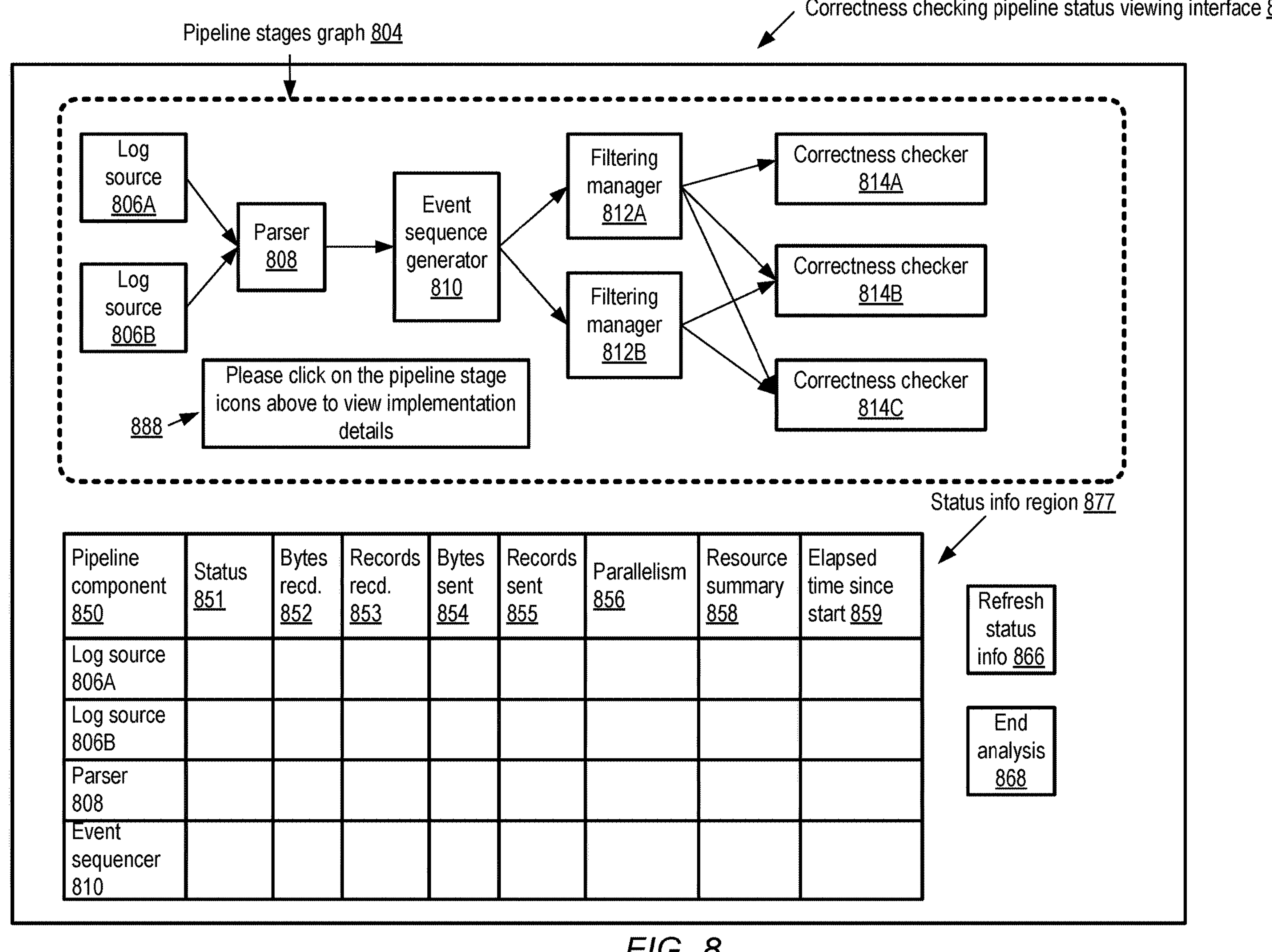
FIG. 8 illustrates an example graphical interface for viewing the status of correctness checking operations being employed for a distributed application, according to at least some embodiments.

FIG. 8 illustrates an example graphical interface for viewing the status of correctness checking operations being employed for a distributed application, according to at least some embodiments. As shown, a graphical correctness checking pipeline status viewing interface 802 may comprise two regions in some embodiments: a pipeline stages graph 804, and a status information region 877. In the pipeline stages graph, respective icons or blocks may indicate the components being used at different stages of a pipeline similar to the pipeline shown in FIG. 4. For example, in the simplified scenario shown in FIG. 8, log records may be collected from two log sources 806A and 806B. The log records may then be parsed at a log parser 808, and event records generated from the log records may be passed on to an event sequence generator 810. Two filtering managers 812A and 812B may forward selected event records from the event record sequences produced by the generator 810 to individual correctness checkers 814A, 814B and/or 814C. The data may be presented via interface 802 in the context of a particular correctness analysis job request in the depicted embodiment; events occurring at a distributed application during some client-specified time period may be analyzed as part of the requested job. As shown in element 888, a client utilizing the interface 802 may obtain implementation details about the different components of the pipeline by clicking on the corresponding icons. The implementation details may, for example, indicate the servers/machines being used for the different pipeline components, their current utilization levels (e.g., CPU utilization, memory utilization, etc.), an indication of the source code being used (e.g., in the case of the parsers and the correctness checkers), and the like in some embodiments.

Metrics, timing information and overall status pertaining to the components of the pipeline may be presented via status information region 877 in the depicted embodiment. For each pipeline component 850, the current status (e.g., whether the component is currently running, waiting for input, or has completed requested analysis) may be shown in status column 851. The bytes received column 852 may indicate the total bytes received thus far at the component (if any), while the records received column 853 may indicate the total number of event records received thus far at the component (if any). Similarly the number of bytes sent or event records sent to downstream stages of the pipeline from a given component may be shown in columns 854 and 855 respectively. Information about parallelism being employed at the component (e.g., the number of processes/threads being used in parallel) may be indicated in column 856. Resource summary column 858 may provide a summary of the resources being used (e.g., the number of compute instances), and the elapsed time since the operations of the requested job began at the component may be indicated in column 859. The client may use refresh status info button 866 if desired to update the presented metrics and status, although in at least some embodiments the presented information may be refreshed automatically (e.g., once every T seconds) if the client does not use the refresh button. End analysis button 868 may be used by the client to terminate the correctness analysis job, if desired, before all the log records indicated in the job request have been processed. In some embodiments, graphical interfaces with elements other than those shown in FIG. 8 may be used to provide status information on ongoing application correctness analysis operations.

FIG. 9 is a flow diagram illustrating aspects of operations which may be performed to verify the correctness of a distributed application, according to at least some embodiments. As shown in element 902, one or more correctness checking rule sets (CCRSs, also referred to as correctness checking specifications) of a distributed application DA1 may be received, e.g., via programmatic interfaces of a distributed application correctness checking service (DACCS) of a cloud provider network, similar in features and functionality to DACCS 120 of FIG. 1. DA1 may be implemented as a collection of constituent services which communicate with one another via messages. Individual ones of the CCRSs may indicate expected/acceptable responses of one or more of the constituent services to one or more events encountered during DA1's execution. Examples of such events may include, among others, the receipt of an asynchronous message of a particular category at one constituent service CS1 from another constituent service CS2 while CS1 is in a particular state. At least some of the CCRSs may also be used during the design phase of DA1 in some embodiments, e.g., to verify correctness of a state machine model of DA1 behavior. Note that the model may not necessarily map exactly to the actual implementation of DA1 in at least some cases.

Components of a correctness analysis pipeline for DA1 may be provisioned or configured in the depicted embodiment (element 906). Such components may include log parsers (for which logic or code may be provided by clients of the DACCS, such as DA1 developers or owners), events sequence generators (which may use log-record-to-event mapping logic provided by clients), event filtering managers, and/or correctness checkers in various embodiments. Each such component may be implemented using some combination of software and hardware at one or more computing devices in some embodiments. The number of instances of each such component may be selected at the DACCS based on an initial estimate of the expected rate at which DA1 events are to be checked for correctness in some embodiments, which may for example be provided by the clients on whose behalf DA1 is to be checked for correctness.

Corresponding to at least a portion of an execution of DA1 during some time interval, timestamped log records may be collected from different resources at which the constituent services are being run (element 910) in the depicted embodiment. Different constituent services may run at respective resources of a resource set being used for the execution, and the timestamps of the log records collected from such resources may represent overlapping time periods. For example, some of the log records collected from a resource R1 being used for a constituent service CS1 during a time interval TI1 may have later timestamps than other log records collected from a different resource R2 being used for a constituent service CS2 during the time interval TI1, others may have earlier timestamps, and so on. In general, the log records generated at the different constituent services' resources may have to be re-arranged or sorted at the DACCS in order to obtain a globally time sequenced collection of log records in at least some embodiments. As mentioned earlier, timestamps may be considered one example of sequencing information (such as monotonically increasing integers that are not necessarily tied to wall-clock time or computer processor clocks) that may be used in equivalent ways in various embodiments.

Using mappings between log records and events defined in the CCRSs, an aggregated timestamped event record sequence may be generated from the collected log records in the depicted embodiment (element 914). In some embodiments, a CCRS may not require ordering of events to be taken into account to verify application correctness, as mentioned earlier. In some such embodiments, an event record sequence arranged in timestamp order may not be created. Note that a given event record may indicate not just the occurrence of an event (such as the reception of a message at a constituent service), but also the response of one or more constituent services (e.g., the actions, if any, taken by a constituent service when it received a message) to the event in some embodiments. In some embodiments, each log record may have an associated key which can be used to assign the log record and associated event record(s) to a particular partition of the overall workload associated with DA1 correctness checking.

On or more filtering managers may be used to transmit respective subsets of the event record sequence to selected correctness checkers (element 918) in various embodiments. For example, each event record may have an associated event identifier, and a mapping between event identifiers and CCRSs may be available to the filtering managers. Respective groups of correctness checkers may have been provisioned for each CCRSs, and/or for each partition of the log records and corresponding event records, and the filtering managers may be provided metadata indicating which correctness checkers can be used for a given CCRS' event records or a given partition's event records.

At the correctness checkers, the CCRSs may be evaluated with respect to the received event records in the depicted embodiment (element 922). Uncertainties in the timestamps of the log records, which may lead to corresponding uncertainties in the timestamps of the event records, may be taken into account when evaluating the CCRSs in some embodiments. For example, multiple candidate event sequences may be generated based on timestamp uncertainty ranges, and each such candidate event sequence may be evaluated to determine whether it represents a potential violation of a CCRS. If a violation of correct or expected behavior is detected, responsive actions may be initiated in various embodiments by a correctness checker, such as notifications or indications of the violation to subscribed authorized entities or individuals, pausing/stopping execution of DA1, etc. In some embodiments, a notification of a violation may include a pointer to a window of records of earlier events (events which occurred immediately prior to the detected violation) to help debug the problem. The size of the window (i.e., how many prior events should be represented in the window, or how long a time interval corresponding to the window should be) may be a configurable parameter selectable by a client of the DACCS in some embodiments.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Figure 10:
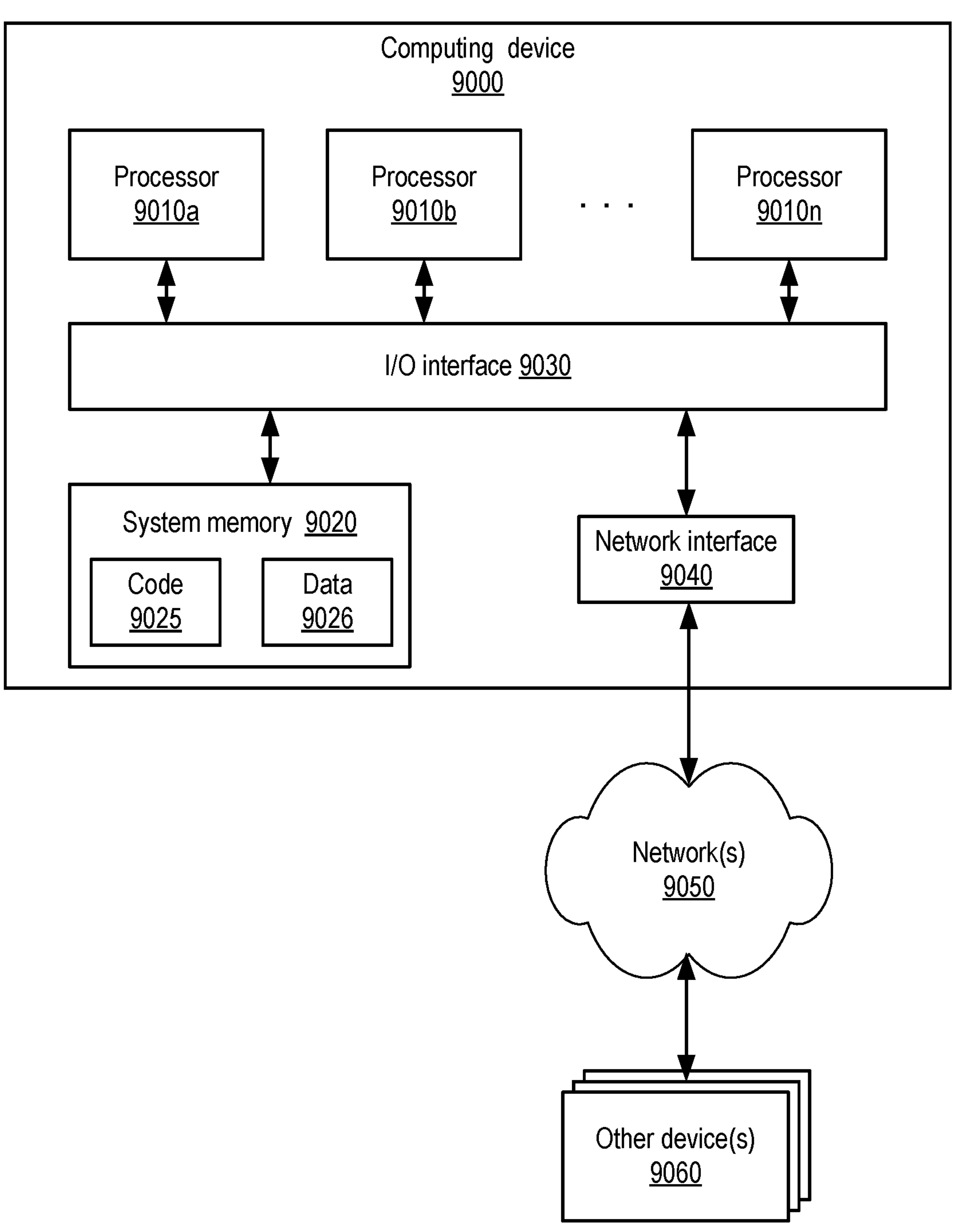
FIG. 10 is a block diagram illustrating an example computing device that may be used in at least some embodiments.

In at least some embodiments, a server that implements the types of techniques described herein (e.g., including functions of a DACCS and/or other services of a cloud provider network) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices:

obtain, at a network-accessible service of a cloud provider network, a plurality of correctness checking specifications for a distributed application, wherein the distributed application comprises a plurality of constituent services, wherein a particular correction checking specification of the plurality of correctness checking specifications pertains to one or more constituent services of the plurality of constituent services, and wherein the particular correctness checking specification indicates an expected response of a first constituent service of the one or more constituent services to a particular event during execution of the distributed application;

collect, corresponding to at least a portion of a particular execution of the distributed application at a resource set, respective groups of timestamped log records generated at individual constituent services of the plurality of constituent services, including a first group of timestamped log records generated at a first resource of the resource set, and a second group of timestamped log records generated at a second resource of the resource set, wherein at least a particular timestamped log record of the second group has a timestamp which is (a) later than a timestamp of a first timestamped log record of the first group and (b) earlier than a timestamp of a second timestamped log record of the first group;

generate, from the respective groups of timestamped log records using a log-records-to-events mapping, an aggregated event record sequence corresponding to the portion of the particular execution, wherein a particular event record of the aggregated event record sequence indicates an occurrence of the particular event, and wherein the particular event record is generated from one or more timestamped log records;

select, at an event record filtering manager, from a plurality of correctness checkers configured for the distributed application, a particular correctness checker for analyzing one or more event records of the aggregated event record sequence, including the particular event record, wherein the particular correctness checker is selected based at least in part on a particular partitioning key stored in a log record from which an event record of the one or more event records is generated;

select, at the event record filtering manager, from the plurality of correctness checkers for the distributed application, another correctness checker for analyzing one or more additional event records of the aggregated event record sequence, wherein the other correctness checker is selected based at least in part on another partitioning key stored in another log record from which another event record of the one or more additional event records is generated; and provide, by the particular correctness checker, based at least in part on analysis of the one or more event records, an indication of one or more violations of correctness checking specifications during the particular execution of the distributed application, including a violation of the particular correctness checking specification at the first constituent service.

2. The system as recited in claim 1, wherein the one or more computing devices include further instructions that upon execution on or across the one or more computing devices:

utilize, during a design phase of the distributed application, prior to the particular execution of the distributed application, the particular correctness checking specification to verify correctness of a state machine model of at least a portion of the distributed application.

3. The system as recited in claim 1, wherein the one or more computing devices include further instructions that upon execution on or across the one or more computing devices:

receive a programmatic request, at the network-accessible service after the distributed application has been deployed to a production environment comprising the resource set, for correctness analysis of the distributed application, wherein the respective groups of timestamped log records are collected in response to the programmatic request.

4. The system as recited in claim 1, wherein the one or more computing devices include further instructions that upon execution on or across the one or more computing devices:

receive, at the network-accessible service, an indication of an uncertainty range associated with respective timestamps of at least a subset of the first group of timestamped log records; and utilize, during the analysis of the one or more event records, the uncertainty range to determine (a) a first potential time sequence of the one or more event records and (b) a second potential time sequence of the one or more event records.

5. The system as recited in claim 1, wherein the first resource of the first resource set is located at a premise external to the cloud provider network.

6. A computer-implemented method, comprising:

collecting, corresponding to a particular execution of a distributed application at a resource set, respective sets of log records generated at individual resources of the resource set, including a first group of log records generated at a first resource of the resource set, and a second group of log records generated at a second resource of the resource set, wherein the distributed application comprises a plurality of constituent services, including a first constituent service run at least in part at the first resource;

generating, from the respective sets of log records, an aggregated event record sequence corresponding to the particular execution, wherein a particular event record of the aggregated event record sequence indicates an occurrence of a particular event for which an expected response of one or more constituent services, including the first constituent service, is indicated in a first correctness checking rule set associated with the distributed application;

selecting, from among a plurality of correctness checkers, a first correctness checker for analyzing one or more event records of the aggregated event record sequence and a second correctness checker for analyzing one or more additional event records of the aggregated event record sequence, wherein the first correctness checker is selected based at least in part on a first partitioning key stored in a log record from which an event record of the one or more event records is generated, and wherein the second correctness checker is selected based at least in part on a second partitioning key stored in another log record from which another event record of the one or more additional event records is generated; and initiating an action responsive to a violation of the first correctness checking rule set, wherein the violation is detected based at least in part on analysis of one or more event records of the aggregated event record sequence.

7. The computer-implemented method as recited in claim 6, further comprising:

configuring the plurality of correctness checkers for the distributed application, including the first correctness checker and the second correctness checker, wherein the violation of the first correctness checking rule set is detected at the first correctness checker.

8. The computer-implemented method as recited in claim 7, wherein the first correctness checker is configured to analyze event records for violations of the first correctness checking rule set, and wherein the second correctness checker is configured to analyze event records for violations of a second correctness checking rule set associated with the distributed application.

9. The computer-implemented method as recited in claim 6, further comprising:

configuring a plurality of event record filtering managers for the distributed application, including a first event record filtering manager and a second event record filtering manager;

forwarding, by the first event record filtering manager, the one or more event records of the aggregated event record sequence for analysis to the first correctness checker associated with the distributed application, wherein the violation of the first correctness checking rule set is detected at the first correctness checker; and forwarding, by the second event record filtering manager, an additional event record of the aggregated event record sequence for analysis to a particular correctness checker associated with the distributed application.

10. The computer-implemented method as recited in claim 9, further comprising:

determining that the first event record filtering manager is to forward a particular event record of the one or more event records, based at least in part on a partitioning key indicated in a log record from which the particular event record was generated.

11. The computer-implemented method as recited in claim 6, wherein the particular execution of the distributed application occurs during one of: (a) a testing stage of the distributed application or (b) a production deployment of the distributed application.

12. The computer-implemented method as recited in claim 6, further comprising:

utilizing, during a design phase of the distributed application prior to the collecting of the respective sets of log records, the first correctness checking rule set to verify correctness of a state machine model of at least a portion of the distributed application.

13. The computer-implemented method as recited in claim 6, further comprising:

obtaining, via one or more programmatic interfaces from a client of a correctness checking service, an indication of one or more of: (a) an action to be initiated in response to a detection of a violation of one or more correctness checking rule sets associated with the distributed application, (b) the first correctness checking rule set, (c) a log analysis algorithm to be used to generate event records from log records, (d) a workload distribution algorithm for verifying correctness of the distributed application, (e) a parallelization policy for verifying correctness of the distributed application, or (f) a buffering algorithm to be used to group log records for event record generation and analysis.

14. The computer-implemented method as recited in claim 6, further comprising:

presenting, via one or more programmatic interfaces, an indication of a respective status of one or more stages of a multi-stage correctness analysis workflow of the distributed application, wherein the multi-stage correctness analysis workflow comprises: (a) a log records collection stage, (b) an event record generation stage, (c) an event record filtering stage, and (d) a correctness checking stage.

15. One or more non-transitory computer-accessible storage media storing program instructions that when executed on or across one or more processors:

collect, corresponding to a particular execution of a distributed application at a resource set, respective sets of log records generated at individual resources of the resource set, including a first group of log records generated at a first resource of the resource set, and a second group of log records generated at a second resource of the resource set, wherein the distributed application comprises a plurality of constituent services, including a first constituent service run at least in part at the first resource, wherein the plurality of constituent services comprises a second constituent service run at least in part at a second resource of the resource set, wherein the first constituent service comprises a program written in a first programming language, wherein the second constituent service comprises a program written in a second programming language, wherein the first resource comprises a first server with a first hardware architecture and a first software stack, wherein the second resources comprises a second server with a second hardware architecture and a second software stack, and wherein the first correctness checking rule set is expressed in a language which is also used to specify a second correctness checking rule set which applies to the second constituent service;

generate, from the respective sets of log records an aggregated event record sequence corresponding to the particular execution, wherein a particular event record of the aggregated event record sequence indicates an occurrence of a particular event for which an expected response of one or more constituent services, including the first constituent service, is indicated in a first correctness checking rule set associated with the distributed application; and initiate an action responsive to a violation of the first correctness checking rule set, wherein the violation is detected based at least in part on analysis of one or more event records of the aggregated event record sequence.

16. The one or more non-transitory computer-accessible storage media as recited in claim 15, storing further program instructions that when executed on or across one or more processors:

utilizing, during analysis of the one or more event records, uncertainty ranges associated with timestamps of log records which were used to generate the one or more event records.

17. The one or more non-transitory computer-accessible storage media as recited in claim 15, storing further program instructions that when executed on or across one or more processors:

receive a representation of the first correctness checking rule set via a programmatic interface, wherein the first correctness checking rule set is expressed in the representation using at least one of: (a) TLA+ (Temporal Logic of Actions Plus), (b) PlusCal, or (c) P.

18. The one or more non-transitory computer-accessible storage media as recited in claim 15, wherein the action comprises one or more of: (a) generating a notification of the violation, (b) pausing the particular execution, or (c) terminating the particular execution.

* * * * *